(12) United States Patent
Zhou et al.

(10) Patent No.: US 11,546,912 B2
(45) Date of Patent: Jan. 3, 2023

(54) RESOURCE CONFLICT RESOLUTION

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US); Seyedkianoush Hosseini, San Diego, CA (US); Hamed Pezeshki, San Diego, CA (US); Konstantinos Dimou, San Francisco, CA (US)

(73) Assignee: QUALCOMM Incorporated, San Diego, CA (US)

(*) Notice: Subject to any disclaimer, the term of this patent is extended or adjusted under 35 U.S.C. 154(b) by 63 days.

(21) Appl. No.: 16/891,629

(22) Filed: Jun. 3, 2020

(65) Prior Publication Data

US 2021/0029704 A1 Jan. 28, 2021

Related U.S. Application Data

(60) Provisional application No. 62/877,268, filed on Jul. 22, 2019.

(51) Int. Cl.
*H04W 72/04* (2009.01)
*H04L 5/00* (2006.01)
(Continued)

(52) U.S. Cl.
CPC ......... *H04W 72/0493* (2013.01); *H04L 5/001* (2013.01); *H04W 56/001* (2013.01);
(Continued)

(58) Field of Classification Search
CPC ............. H04W 72/0493; H04W 76/11; H04W 56/001; H04W 72/0453; H04W 74/0833;
(Continued)

(56) References Cited

U.S. PATENT DOCUMENTS

| | | | |
|---|---|---|---|
| 2011/0105136 A1* | 5/2011 | Choi | H04W 48/08 455/452.1 |
| 2015/0282173 A1* | 10/2015 | Wang | H04W 72/1263 370/329 |

(Continued)

OTHER PUBLICATIONS

International Search Report and Written Opinion—PCT/US2020/036145—ISA/EPO—dated Oct. 19, 2020.
(Continued)

*Primary Examiner* — Hardikkumar D Patel
(74) *Attorney, Agent, or Firm* — Holland & Hart LLP

(57) ABSTRACT

Methods, systems, and devices for wireless communications are described. A base station may switch semi-persistently scheduled (SPS) or configured grant (CG) transmissions for a user equipment (UE) across component carriers according to a resource switching pattern to avoid resource conflict with control information on one or more component carriers. The resource switching pattern may have multiple flows spanning different component over a time interval for redundancy. According to some aspects, a base station may transmit a synchronization signal block (SSB) in one of a set of flexible SSB locations or candidate SSB locations, where each of the set of candidate SSB locations is associated with a respective SSB identifier.

30 Claims, 25 Drawing Sheets

(51) Int. Cl.
  *H04W 74/08* (2009.01)
  *H04W 76/11* (2018.01)
  *H04W 56/00* (2009.01)

(52) U.S. Cl.
  CPC ... *H04W 72/0453* (2013.01); *H04W 74/0833* (2013.01); *H04W 76/11* (2018.02)

(58) Field of Classification Search
  CPC .......... H04W 72/085; H04W 72/1268; H04W 48/20; H04W 72/1236; H04W 72/082; H04W 56/0015; H04L 5/001; H04L 5/0037; H04L 5/0053; H04L 5/005; H04L 5/0094
  See application file for complete search history.

(56) References Cited

U.S. PATENT DOCUMENTS

| | | | |
|---|---|---|---|
| 2016/0345247 A1* | 11/2016 | Kim | H04W 74/0833 |
| 2017/0134125 A1* | 5/2017 | Oyama | H04W 72/082 |
| 2018/0049181 A1* | 2/2018 | Wu | H04W 76/19 |
| 2018/0287840 A1* | 10/2018 | Akkarakaran | H04L 27/262 |
| 2019/0182782 A1 | 6/2019 | Wang et al. | |
| 2019/0387485 A1* | 12/2019 | Ko | H04W 72/042 |
| 2020/0337005 A1* | 10/2020 | Bengtsson | H04W 8/24 |
| 2020/0374799 A1* | 11/2020 | Kuang | H04L 5/0098 |
| 2020/0374890 A1* | 11/2020 | Wu | H04J 11/0023 |
| 2021/0126753 A1* | 4/2021 | Mochizuki | H04W 72/1268 |
| 2021/0243794 A1* | 8/2021 | Li | H04L 5/0044 |
| 2021/0250882 A1* | 8/2021 | Lin | H04W 56/00 |
| 2021/0274559 A1* | 9/2021 | Hwang | H04W 74/0833 |

OTHER PUBLICATIONS

Partial International Search Report—PCT/US2020/036145—ISAEPO—dated Aug. 26, 2020.

* cited by examiner

RESOURCE CONFLICT RESOLUTION

CROSS REFERENCE

The present Application for Patent claims benefit of U.S. Provisional Patent Application No. 62/877,268 by ZHOU et al., entitled "RESOURCE CONFLICT RESOLUTION," filed Jul. 22, 2019, assigned to the assignee hereof, and expressly incorporated by reference herein.

FIELD OF TECHNOLOGY

The following relates generally to wireless communications and more specifically to resource conflict resolution.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Base stations and UEs may communicate using beamforming techniques and during such communications, a base station may transmit a synchronization signal block (SSB) burst. The SSB burst may contain multiple SSBs transmitted via beams in various directions around the base station. In some cases, the SSBs may be scheduled for transmission over time-frequency resources scheduled for other communications (e.g., data communications), which may cause a scheduling or resource conflict, interference, or dropped transmissions.

SUMMARY

The described techniques relate to improved methods, systems, devices, and apparatuses that support resource conflict resolution. A base station may switch semi-persistent scheduling (SPS) or configured grant (CG) transmissions for a UE across frequency resources (e.g., component carriers) according to a switching pattern. Switching SPS/CG transmissions between frequency resources may involve scheduling SPS or CG transmission via one component carrier over a first time interval and via a second component carrier (or multiple component carriers) in a second time interval. Such techniques may reduce or avoid the impact of scheduling SPS/CG transmission over the same frequency resources as control transmissions.

According to some aspects, a base station may transmit an SSB in one of a set of flexible SSB locations. For example, the base station may configure an SSB to include an SSB identifier (ID), which indicates the SSB location (e.g., a symbol) within the set of flexible SSB locations and may then transmit the SSB in the selected flexible location to avoid conflicts with SPS/CG transmissions.

In some examples, a base station may transmit an SSB in one of a set of candidate SSB locations where each of the set of candidate SSB locations is associated with a respective SSB ID. The base station may select a candidate SSB location (e.g., a symbol) based on scheduled control traffic such that the selected candidate SSB location does not overlap the scheduled SPS/CG transmissions.

A method of wireless communications at a UE is described. The method may include receiving control signaling that indicates a set of frequency resources for communicating with a base station and a resource allocation for a semi-persistent transmission using a first frequency resource of the set of frequency resources, identifying a resource switching pattern for switching from the first frequency resource to a different frequency resource of the set of frequency resources, and communicating the semi-persistent transmission with the base station via a second frequency resource of the set of frequency resources based on the resource switching pattern.

An apparatus for wireless communications at a UE is described. The apparatus may include a processor, memory coupled with the processor, and instructions stored in the memory. The instructions may be executable by the processor to cause the apparatus to receive control signaling that indicates a set of frequency resources for communicating with a base station and a resource allocation for a semi-persistent transmission using a first frequency resource of the set of frequency resources, identify a resource switching pattern for switching from the first frequency resource to a different frequency resource of the set of frequency resources, and communicate the semi-persistent transmission with the base station via a second frequency resource of the set of frequency resources based on the resource switching pattern.

Another apparatus for wireless communications at a UE is described. The apparatus may include means for receiving control signaling that indicates a set of frequency resources for communicating with a base station and a resource allocation for a semi-persistent transmission using a first frequency resource of the set of frequency resources, identifying a resource switching pattern for switching from the first frequency resource to a different frequency resource of the set of frequency resources, and communicating the semi-persistent transmission with the base station via a second frequency resource of the set of frequency resources based on the resource switching pattern.

A non-transitory computer-readable medium storing code for wireless communications at a UE is described. The code may include instructions executable by a processor to receive control signaling that indicates a set of frequency resources for communicating with a base station and a resource allocation for a semi-persistent transmission using a first frequency resource of the set of frequency resources, identify a resource switching pattern for switching from the first frequency resource to a different frequency resource of the set of frequency resources, and communicate the semi-persistent transmission with the base station via a second frequency resource of the set of frequency resources based on the resource switching pattern.

In some examples of the method, apparatuses, and non-transitory computer-readable medium described herein, the set of frequency resources includes one or more component carriers.

In some examples of the method, apparatuses, and non-transitory computer-readable medium described herein, the resource switching pattern may be determined at least to avoid the semi-persistent transmission partially overlapping in time with control traffic.

In some examples of the method, apparatuses, and non-transitory computer-readable medium described herein, the control traffic may include operations, features, means, or instructions for receiving an SSB from the base station or transmitting a random access message to the base station.

In some examples of the method, apparatuses, and non-transitory computer-readable medium described herein, the semi-persistent transmission conveys data.

In some examples of the method, apparatuses, and non-transitory computer-readable medium described herein, the semi-persistent transmission includes a periodic transmission.

In some examples of the method, apparatuses, and non-transitory computer-readable medium described herein, the semi-persistent transmission includes a downlink transmission based on semi-persistent scheduling.

In some examples of the method, apparatuses, and non-transitory computer-readable medium described herein, the semi-persistent transmission includes an uplink transmission based on a CG.

Some examples of the method, apparatuses, and non-transitory computer-readable medium described herein may further include operations, features, means, or instructions for receiving, from the base station, a resource switching pattern configuration that indicates the resource switching pattern.

Some examples of the method, apparatuses, and non-transitory computer-readable medium described herein may further include operations, features, means, or instructions for receiving, in the resource switching pattern configuration, an indication of a time period that occurs between adjacent communication occasions for communicating the semi-persistent transmission.

Some examples of the method, apparatuses, and non-transitory computer-readable medium described herein may further include operations, features, means, or instructions for communicating the semi-persistent transmission with the base station via a third frequency resource of the set of frequency resources based on the resource switching pattern for the semi-persistent transmission.

Some examples of the method, apparatuses, and non-transitory computer-readable medium described herein may further include operations, features, means, or instructions for receiving a semi-persistent transmission configuration for each respective component carrier of the set of frequency resources.

In some examples of the method, apparatuses, and non-transitory computer-readable medium described herein, the semi-persistent transmission configuration for each respective component carrier at least includes a time period that occurs between adjacent communication occasions for the semi-persistent transmission on the respective component carrier.

In some examples of the method, apparatuses, and non-transitory computer-readable medium described herein, the semi-persistent transmission configuration for each respective component carrier at least includes a time duration, where the semi-persistent transmission configuration for the respective component carrier may be valid.

Some examples of the method, apparatuses, and non-transitory computer-readable medium described herein may further include operations, features, means, or instructions for receiving a configuration ID and an anchoring cell ID associated with the resource switching pattern in the resource switching pattern configuration.

In some examples of the method, apparatuses, and non-transitory computer-readable medium described herein, the anchoring cell ID corresponds to a cell supporting the first frequency resource, and the configuration ID indicates the switching from the first frequency resource to the different frequency resource.

In some examples of the method, apparatuses, and non-transitory computer-readable medium described herein, the resource switching pattern may be associated with a respective resource switching period of the resource switching pattern configuration.

A method of wireless communications at a UE is described. The method may include receiving control signaling that indicates a time window within which the UE is to monitor for an SSB of a radio frame, decoding the SSB from the time window, the SSB indicating an offset of the SSB relative to a frame boundary of the radio frame, and decoding control information, data traffic, or both, of the radio frame based on the offset and the frame boundary.

An apparatus for wireless communications at a UE is described. The apparatus may include a processor, memory coupled with the processor, and instructions stored in the memory. The instructions may be executable by the processor to cause the apparatus to receive control signaling that indicates a time window within which the UE is to monitor for an SSB of a radio frame, decode the SSB from the time window, the SSB indicating an offset of the SSB relative to a frame boundary of the radio frame, and decode control information, data traffic, or both, of the radio frame based on the offset and the frame boundary.

Another apparatus for wireless communications at a UE is described. The apparatus may include means for receiving control signaling that indicates a time window within which the UE is to monitor for an SSB of a radio frame, decoding the SSB from the time window, the SSB indicating an offset of the SSB relative to a frame boundary of the radio frame, and decoding control information, data traffic, or both, of the radio frame based on the offset and the frame boundary.

A non-transitory computer-readable medium storing code for wireless communications at a UE is described. The code may include instructions executable by a processor to receive control signaling that indicates a time window within which the UE is to monitor for an SSB of a radio frame, decode the SSB from the time window, the SSB indicating an offset of the SSB relative to a frame boundary of the radio frame, and decode control information, data traffic, or both, of the radio frame based on the offset and the frame boundary.

Some examples of the method, apparatuses, and non-transitory computer-readable medium described herein may further include operations, features, means, or instructions for monitoring a set of flexible locations within the time window for a set of SSBs including the SSB based on the control signaling.

Some examples of the method, apparatuses, and non-transitory computer-readable medium described herein may further include operations, features, means, or instructions for receiving the SSB at a first flexible location of the set of flexible locations based on the monitoring, where the SSB indicates the first flexible location.

Some examples of the method, apparatuses, and non-transitory computer-readable medium described herein may further include operations, features, means, or instructions for receiving the SSB at a first flexible location of the set of flexible locations based on the monitoring, where the first flexible location indicates an SSB ID associated with the SSB.

A method of wireless communications at a UE is described. The method may include receiving control signaling that indicates a set of candidate locations for an SSB within a radio frame, decoding the SSB at a first candidate location of the set of candidate locations, and decoding control information, data traffic, or both, of the radio frame based on a frame boundary of the radio frame identified relative to the first candidate location.

An apparatus for wireless communications at a UE is described. The apparatus may include a processor, memory coupled with the processor, and instructions stored in the memory. The instructions may be executable by the processor to cause the apparatus to receive control signaling that indicates a set of candidate locations for an SSB within a radio frame, decode the SSB at a first candidate location of the set of candidate locations, and decode control information, data traffic, or both, of the radio frame based on a frame boundary of the radio frame identified relative to the first candidate location.

Another apparatus for wireless communications at a UE is described. The apparatus may include means for receiving control signaling that indicates a set of candidate locations for an SSB within a radio frame, decoding the SSB at a first candidate location of the set of candidate locations, and decoding control information, data traffic, or both, of the radio frame based on a frame boundary of the radio frame identified relative to the first candidate location.

A non-transitory computer-readable medium storing code for wireless communications at a UE is described. The code may include instructions executable by a processor to receive control signaling that indicates a set of candidate locations for an SSB within a radio frame, decode the SSB at a first candidate location of the set of candidate locations, and decode control information, data traffic, or both, of the radio frame based on a frame boundary of the radio frame identified relative to the first candidate location.

Some examples of the method, apparatuses, and non-transitory computer-readable medium described herein may further include operations, features, means, or instructions for monitoring the set of candidate locations for the SSB based on the control signaling, where each of the set of candidate locations may be associated with a respective SSB ID, and receiving the SSB at the first candidate location based on the monitoring.

Some examples of the method, apparatuses, and non-transitory computer-readable medium described herein may further include operations, features, means, or instructions for monitoring a subset of the set of candidate locations for the SSB, where each of the subset of the set of candidate locations may be associated with an SSB ID that corresponds to the SSB, and receiving the SSB at the first candidate location based on the monitoring.

A method of wireless communications at a base station is described. The method may include transmitting control signaling for configuring a UE with a set of frequency resources for communicating with the base station and a resource allocation for a semi-persistent transmission via a first frequency resource of the set of frequency resources, identifying a resource switching pattern for switching from the first frequency resource to a different frequency resource of the set of frequency resources, and communicating the semi-persistent transmission with the UE via a second frequency resource of the set of frequency resources based on the resource switching pattern.

An apparatus for wireless communications at a base station is described. The apparatus may include a processor, memory coupled with the processor, and instructions stored in the memory. The instructions may be executable by the processor to cause the apparatus to transmit control signaling for configuring a UE with a set of frequency resources for communicating with the base station and a resource allocation for a semi-persistent transmission via a first frequency resource of the set of frequency resources, identify a resource switching pattern for switching from the first frequency resource to a different frequency resource of the set of frequency resources, and communicate the semi-persistent transmission with the UE via a second frequency resource of the set of frequency resources based on the resource switching pattern.

Another apparatus for wireless communications at a base station is described. The apparatus may include means for transmitting control signaling for configuring a UE with a set of frequency resources for communicating with the base station and a resource allocation for a semi-persistent transmission via a first frequency resource of the set of frequency resources, identifying a resource switching pattern for switching from the first frequency resource to a different frequency resource of the set of frequency resources, and communicating the semi-persistent transmission with the UE via a second frequency resource of the set of frequency resources based on the resource switching pattern.

A non-transitory computer-readable medium storing code for wireless communications at a base station is described. The code may include instructions executable by a processor to transmit control signaling for configuring a UE with a set of frequency resources for communicating with the base station and a resource allocation for a semi-persistent transmission via a first frequency resource of the set of frequency resources, identify a resource switching pattern for switching from the first frequency resource to a different frequency resource of the set of frequency resources, and communicate the semi-persistent transmission with the UE via a second frequency resource of the set of frequency resources based on the resource switching pattern.

In some examples of the method, apparatuses, and non-transitory computer-readable medium described herein, the set of frequency resources includes one or more component carriers.

In some examples of the method, apparatuses, and non-transitory computer-readable medium described herein, the resource switching pattern may be determined at least to avoid the semi-persistent transmission partially overlapping in time with control traffic.

In some examples of the method, apparatuses, and non-transitory computer-readable medium described herein, the control traffic may include operations, features, means, or instructions for receiving an SSB from the base station or transmitting a random access message to the base station.

In some examples of the method, apparatuses, and non-transitory computer-readable medium described herein, the semi-persistent transmission conveys data.

In some examples of the method, apparatuses, and non-transitory computer-readable medium described herein, the semi-persistent transmission includes a periodic transmission.

In some examples of the method, apparatuses, and non-transitory computer-readable medium described herein, the semi-persistent transmission includes a downlink transmission based on semi-persistent scheduling.

In some examples of the method, apparatuses, and non-transitory computer-readable medium described herein, the semi-persistent transmission includes an uplink transmission based on a CG.

Some examples of the method, apparatuses, and non-transitory computer-readable medium described herein may further include operations, features, means, or instructions for transmitting, to the UE, a resource switching pattern configuration that indicates the resource switching pattern.

Some examples of the method, apparatuses, and non-transitory computer-readable medium described herein may further include operations, features, means, or instructions for transmitting, in the resource switching pattern configuration, an indication of a time period that occurs between adjacent communication occasions for communicating the semi-persistent transmission.

Some examples of the method, apparatuses, and non-transitory computer-readable medium described herein may further include operations, features, means, or instructions for communicating the semi-persistent transmission with the UE via a third frequency resource of the set of frequency resources based on the resource switching pattern for the semi-persistent transmission.

Some examples of the method, apparatuses, and non-transitory computer-readable medium described herein may further include operations, features, means, or instructions for transmitting respective semi-persistent transmission configurations via respective component carriers of the set of frequency resources.

In some examples of the method, apparatuses, and non-transitory computer-readable medium described herein, the respective semi-persistent transmission configuration for each respective component carrier at least includes a time period that occurs between adjacent communication occasions for the semi-persistent transmission on the respective component carrier.

In some examples of the method, apparatuses, and non-transitory computer-readable medium described herein, the respective semi-persistent transmission configuration for each respective component carrier at least includes a time duration, where the semi-persistent transmission configuration for the respective component carrier may be valid.

Some examples of the method, apparatuses, and non-transitory computer-readable medium described herein may further include operations, features, means, or instructions for transmitting a configuration ID and an anchoring cell ID associated with the resource switching pattern in the resource switching pattern configuration.

In some examples of the method, apparatuses, and non-transitory computer-readable medium described herein, the anchoring cell ID corresponds to a cell supporting the first frequency resource, and the configuration ID indicates the switching from the first frequency resource to the different frequency resource.

In some examples of the method, apparatuses, and non-transitory computer-readable medium described herein, the resource switching pattern may be associated with a respective resource switching period of the resource switching pattern configuration.

A method of wireless communications at a base station is described. The method may include transmitting control signaling that indicates a time window within which a UE is to monitor for an SSB within a radio frame, scheduling transmission of data traffic within the radio frame and transmission of the SSB within a portion of the radio frame not scheduled for transmission of data traffic, and transmitting, within the time window, the SSB that indicates a relationship between a location of the SSB and a boundary of the radio frame.

An apparatus for wireless communications at a base station is described. The apparatus may include a processor, memory coupled with the processor, and instructions stored in the memory. The instructions may be executable by the processor to cause the apparatus to transmit control signaling that indicates a time window within which a UE is to monitor for an SSB within a radio frame, schedule transmission of data traffic within the radio frame and transmission of the SSB within a portion of the radio frame not scheduled for transmission of data traffic, and transmit, within the time window, the SSB that indicates a relationship between a location of the SSB and a boundary of the radio frame.

Another apparatus for wireless communications at a base station is described. The apparatus may include means for transmitting control signaling that indicates a time window within which a UE is to monitor for an SSB within a radio frame, scheduling transmission of data traffic within the radio frame and transmission of the SSB within a portion of the radio frame not scheduled for transmission of data traffic, and transmitting, within the time window, the SSB that indicates a relationship between a location of the SSB and a boundary of the radio frame.

A non-transitory computer-readable medium storing code for wireless communications at a base station is described. The code may include instructions executable by a processor to transmit control signaling that indicates a time window within which a UE is to monitor for an SSB within a radio frame, schedule transmission of data traffic within the radio frame and transmission of the SSB within a portion of the radio frame not scheduled for transmission of data traffic, and transmit, within the time window, the SSB that indicates a relationship between a location of the SSB and a boundary of the radio frame.

Some examples of the method, apparatuses, and non-transitory computer-readable medium described herein may further include operations, features, means, or instructions for transmitting a set of SSBs including the SSB in a set of flexible locations within the time window, each of the set of SSBs indicating an offset of a respective SSB with respect to the boundary of the radio frame.

Some examples of the method, apparatuses, and non-transitory computer-readable medium described herein may further include operations, features, means, or instructions for transmitting the SSB at a first flexible location of a set of flexible locations within the time window, where the SSB indicates the first flexible location.

Some examples of the method, apparatuses, and non-transitory computer-readable medium described herein may further include operations, features, means, or instructions for transmitting the SSB at a first flexible location of a set of flexible locations within the time window, where the first flexible location indicates an SSB ID associated with the SSB.

A method of wireless communications at a base station is described. The method may include transmitting control signaling that indicates a set of candidate locations for an SSB within a radio frame, scheduling transmission of the SSB within a first candidate location of the set of candidate locations of the radio frame that does not overlap with a resource of the radio frame scheduled for transmission of data traffic, and transmitting the SSB at the first candidate location within the radio frame based on the scheduling.

An apparatus for wireless communications at a base station is described. The apparatus may include a processor, memory coupled with the processor, and instructions stored in the memory. The instructions may be executable by the processor to cause the apparatus to transmit control signaling that indicates a set of candidate locations for an SSB within a radio frame, schedule transmission of the SSB within a first candidate location of the set of candidate locations of the radio frame that does not overlap with a resource of the radio frame scheduled for transmission of data traffic, and transmit the SSB at the first candidate location within the radio frame based on the scheduling.

Another apparatus for wireless communications at a base station is described. The apparatus may include means for transmitting control signaling that indicates a set of candidate locations for an SSB within a radio frame, scheduling transmission of the SSB within a first candidate location of the set of candidate locations of the radio frame that does not overlap with a resource of the radio frame scheduled for transmission of data traffic, and transmitting the SSB at the first candidate location within the radio frame based on the scheduling.

A non-transitory computer-readable medium storing code for wireless communications at a base station is described. The code may include instructions executable by a processor to transmit control signaling that indicates a set of candidate locations for an SSB within a radio frame, schedule transmission of the SSB within a first candidate location of the set of candidate locations of the radio frame that does not overlap with a resource of the radio frame scheduled for transmission of data traffic, and transmit the SSB at the first candidate location within the radio frame based on the scheduling.

Some examples of the method, apparatuses, and non-transitory computer-readable medium described herein may further include operations, features, means, or instructions for selecting the first candidate location of the set of candidate locations for the SSB based on the resource of the radio frame scheduled for transmission of data traffic, where each of the set of candidate locations may be associated with a respective SSB ID.

Some examples of the method, apparatuses, and non-transitory computer-readable medium described herein may further include operations, features, means, or instructions for selecting a subset of the set of candidate locations for transmission of the SSB, where each of the subset of the set of candidate locations may be associated with an SSB ID that corresponds to the SSB.

DETAILED DESCRIPTION

Figure 1:
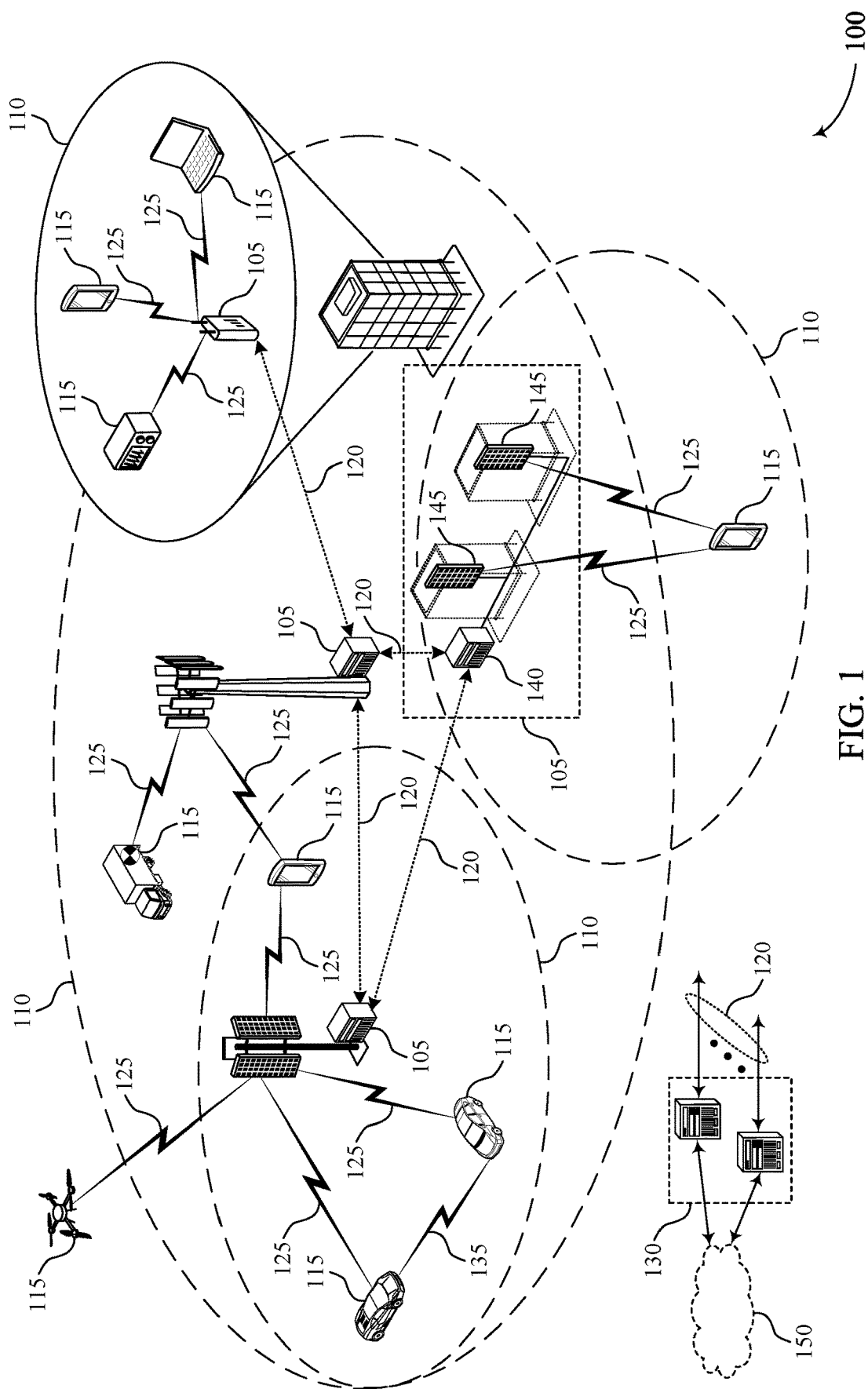
FIG. 1 illustrates an example of a wireless communications system that supports resource conflict resolution in accordance with aspects of the present disclosure.

The described techniques relate to improved methods, systems, devices, and apparatuses that support resource conflict resolution. A base station may switch SPS or CG transmissions for a UE across frequency resources (e.g., component carriers) according to a switching pattern (e.g., a predetermined switching pattern, a dynamic switching pattern, or a configured switching pattern for the UE or base station). Switching SPS/CG transmissions between frequency resources may reduce or avoid the impact of scheduling SPS/CG transmission over the same time-frequency resources as other transmissions (e.g., control transmissions such as SSB transmissions from the base station or random access channel (RACH) transmission from the UE). In some cases, the base station may signal a SPS/CG transmission switching pattern (e.g., a resource switching pattern) to the UE, which may indicate the frequency resources and corresponding time intervals over which SPS/CG transmissions are switched from a first frequency resource (e.g., a first component carrier) to a second frequency resource (e.g., a second component carrier). Using such a switching pattern may help prevent or mitigate potential resource conflicts during the scheduling of SPS/CG transmissions based on control traffic (e.g., periodic control traffic). The SPS/CG transmission switching pattern may have multiple flows spanning different frequency resources (e.g., simultaneous or concurrent flows) over given time intervals for redundancy and improved reliability.

According to some aspects, the base station may transmit an SSB in one of a set of flexible SSB locations (e.g., a set of symbols). For example, multiple flexible SSB locations may be configured or predefined and the base station may select one or more of the flexible SSB locations for transmission of one or more SSBs. The base station may select a flexible SSB location (e.g., a symbol) based on scheduled SPS/CG transmissions such that the flexible SSB location does not overlap the scheduled SPS/CG transmissions. In such cases, the base station may configure the SSB to contain an SSB ID, which indicates the SSB location (e.g., an offset with respect to a frame in which the SSB is transmitted). Such techniques may allow the base station to distribute SSBs across the flexible SSB locations to avoid conflicts with SPS/CG transmissions.

In some examples, the base station may transmit an SSB in one of a set of candidate SSB locations (e.g., a set of symbols) where each of the set of candidate SSB locations is associated with a respective SSB ID. For example, multiple candidate SSB locations may be configured or pre-defined and have an associated SSB ID. The base station may select one or more of the candidate SSB locations for transmission of one or more SSBs that correspond to the SSB IDs of the selected candidate SSB locations. The base station may select a candidate SSB location (e.g., a symbol) based on scheduled SPS/CG transmissions such that the selected candidate SSB location does not overlap the scheduled SPS/CG transmissions.

Particular aspects of the subject matter described herein may be implemented to realize one or more advantages. The described techniques may support improvements in resource conflict, dropped transmissions, communication interference, and reliability, among other advantages. As such, supported techniques may include improved network operations and, in some examples, may promote network efficiencies, among other benefits.

Aspects of the disclosure are initially described in the context of wireless communications systems. Aspects are then described with respect to a resource switching configuration, SSB configuration schemes, and a process flow. Aspects of the disclosure are further illustrated by and described with reference to apparatus diagrams, system diagrams, and flowcharts that relate to resource conflict resolution.

FIG. 1 illustrates an example of a wireless communications system 100 that supports resource conflict resolution in accordance with aspects of the present disclosure. The wireless communications system 100 may include base stations 105, UEs 115, and a core network 130. In some examples, the wireless communications system 100 may be an LTE network, an LTE-A network, an LTE-A Pro network, or an NR network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a nonstandalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an ID for distinguishing neighboring cells (e.g., a physical cell ID (PCID), a virtual cell ID (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, the receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, the receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A base station 105 may switch SPS/CG transmissions across different frequency resources (e.g., different component carriers) according to a resource switching pattern. For example, the base station 105 may configure a UE 115 with multiple component carriers for communication with the base station 105. Resources such as periodic resources may be allocated to the UE 115 for transmission of control information (e.g., transmission of SSBs by the base station 105 or transmission of RACH messages by the UE 115) using a first component carrier of the component carriers. When scheduling SPS or CG transmissions for the UE 115, the base station 105 may allocate time intervals for communication of the SPS or CG transmissions via the first component carrier, and other time intervals for communication of the SPS or CG transmissions via a second, different component carrier, which may reduce or avoid negative impacts on periodic non-data (e.g., control) transmission (e.g., SSB or RACH transmissions).

In some examples, the base station 105 may signal the SPS/CG transmission switching pattern to the UE 115, and the SPS/CG transmission switching pattern may have multiple flows simultaneously or concurrently on different component carriers for redundancy, which may lead to improved reliability.

In some examples, the base station 105 may configure an SSB for transmission in flexible SSB locations where the SSB includes an SSB ID indicating the location of the SSB. In other examples, the base station 105 may configure an SSB for transmission in candidate SSB locations, where each candidate SSB location is associated with a respective SSB ID.

Figure 2:
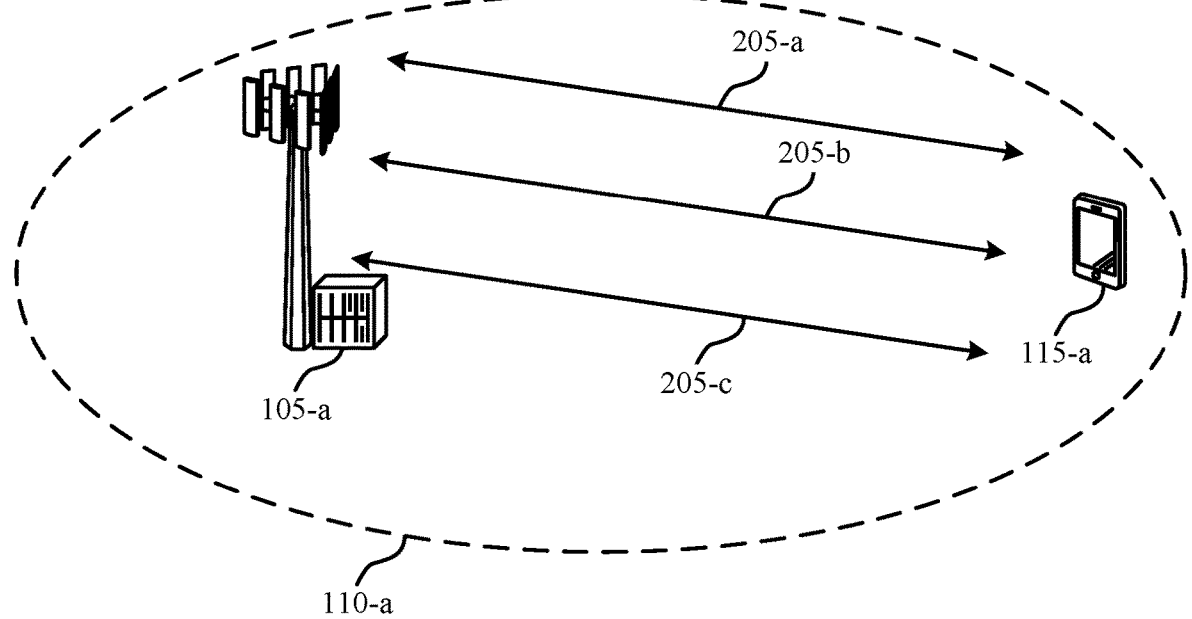
FIG. 2 illustrates an example of a wireless communications system that supports resource conflict resolution in accordance with aspects of the present disclosure.

FIG. 2 illustrates an example of a wireless communications system 200 that supports resource conflict resolution in accordance with aspects of the present disclosure. In some examples, wireless communications system 200 may implement aspects of wireless communications system 100. As shown, wireless communications system 200 includes base stations 105-*a* and UEs 115-*a*, which may be examples of the corresponding devices described with reference to FIG. 1.

In wireless communications system 200, base station 105-*a* may transmit control signaling for configuring UE 115-*a* with component carriers 205-*a*, 205-*b*, and 205-*c*, which may be used for communications between the base station 105-*a* and the UE 115-*a*. In some examples, the base station 105-*a* may communicate with UE 115-*a* via component carriers 205-*a*, 205-*b*, or 205-*c* using beamforming techniques such that signals may be transmitted in directions about the base station 105-*a*. Some wireless techniques may utilize SSBs or RACH messages for synchronization between the UE 115-*a* and the base station 105-*a*. For example, base station 105-*a* may transmit a set of SSBs in an SSB burst to the UE 115-*a* or the UE 115-*a* may transmit a RACH message (e.g., RACH preamble, RACH Msg1) to the base station 105-*a*. The SSB burst may contain multiple SSBs transmitted via respective transmit beams (e.g., in different directions) from the base station 105-*a* to a group of UEs including UE 115-*a* supported by the base station 105-*a* in coverage area 110-*a*.

The SSBs or RACH messages may be transmitted in fixed resources (e.g., fixed time-frequency resources transmitted via a given component carrier within a given time interval). For instance, in a mmW radio frequency spectrum band (frequency range 1 (FR1), frequency range 2 (FR2), etc.), there may be 64 SSB locations (e.g., symbols) available for transmission of the SSBs. Due to periodic traffic (e.g., industrial IoT (IIoT) traffic, SPS traffic, CG traffic) with a short cycle duration (e.g., less than 1 ms), however, only a subset of symbols may be available for transmission of the SSBs as other symbols may be allocated for the periodic traffic. For example, if an SPS/CG transmission is occupying a potential SSB location or a symbol designated for a given SSB within an SSB burst, the base station 105-*a* may be unable to communicate both the SSB and the SPS/CG traffic via the same component carrier or over the same time interval.

In some examples, subframes with a 0.5 ms cycle duration may contain 4 slots per cycle for 16 cycles, resulting in 64 potential SSB locations. Of the potential 64 SSB locations, 32 SSB locations may be available to receive an SSB, as 2 of the 4 slots per cycle may be IIoT traffic (e.g., 7 UEs with 2 symbols each, downlink and uplink). Subframes with a 1 ms cycle duration may contain 8 slots per cycle for 8 cycles, resulting in 64 potential SSB locations. Of the potential 64 SSB locations, 24 SSB locations may be available to receive an SSB, as 2 of the 8 slots per cycle may be IIoT traffic and 3 of the 8 slots may be for potential retransmission of the SSB. In some cases, 48 SSB locations may be available to receive an SSB, as 6 of the 8 slots per cycle may be available if no slots are reserved for potential retransmission of the SSB. If no slots are reserved for potential retransmission, however, the SSB transmission may be dropped which may result in insufficient beam management (BM) as the UE 115-a may not receive the SSB for determining a radio link failure (RLF) or whether to perform a beam recovery procedure.

In some cases, subframes with a 0.5 ms cycle duration may support more than 2 of the 4 slots per cycle for IIoT traffic, resulting in more than 32 SSB locations being available for transmission of an SSB by the base station 105-a. In other cases, the subframes with a 0.5 ms cycle duration may support more than 3 of the 4 slots per cycle for IIoT traffic, resulting in more than 16 SSB locations being available for transmission of an SSB by the base station 105-a.

In some examples, for each cycle duration, a tradeoff may be considered between the number of SSBs (e.g., maximum number of SSBs), number of slots containing traffic (e.g., IIoT traffic), and a number of free slots within an SSB burst. Such a tradeoff may be considered based on Table 1 below.

TABLE 1

| Cycle duration | Case | Max No. of SSBs | No. of traffic slots per cycle | Free slot # per cycle during SSB burst |
|---|---|---|---|---|
| 0.5 ms | Case 1 | 32 SSBs | 2 slots | 0 slots |
|  | Case 2 | 16 SSBs | 2 slots | 1 slots |
|  | Case 3 | 16 SSBs | 3 slots | 0 slots |
| 1 ms | Case 1 | 48 SSBs | 2 slots | 0 slots |
|  | Case 2 | 24 SSBs | 2 slots | 3 slots |

To avoid or mitigate resource conflicts between SSBs or RACH messages and semi-persistent traffic (e.g., IIoT traffic), base station 105-a may switch semi-persistent transmissions (e.g., SPS or CG transmissions) across component carriers 205-a, 205-b, and 205-c according to a resource switching pattern. For instance, the base station 105-a may allocate SPS or CG transmissions to time resources (e.g., a first set of time intervals) on a first component carrier and to time resources on a second component carrier. In some examples, base station 105-a may identify or determine a resource switching pattern based on resources allocated for control traffic (e.g., SSBs or RACH messages) over component carriers 205-a, 205-b, and 205-c. Adjusting the resource allocation for SPS/CG transmissions between component carriers may reduce or avoid the impact of periodic non-data resources (e.g., SSB/RACH) on SPS/CG transmissions.

In some examples, base station 105-a may signal a SPS/CG transmission switching pattern to the UE 115-a, which may indicate the resource switching pattern for SPS/CG transmissions over multiple component carriers, and base station 105-a and UE 115-a may communicate data of SPS/CG transmissions on different component carriers according to the resource switching pattern. The SPS/CG transmission switching pattern may indicate multiple communication flows simultaneously or concurrently on different component carriers such that some SPS/CG transmissions may be repeated across multiple component carriers during the same or overlapping time intervals. Such techniques may improve reliability and decoding success of the transmission.

Wireless communications system 200 may, additionally or alternatively, support flexible or candidate SSB locations. For example, base station 105-a may configure transmission of an SSB in one of a set of flexible SSB locations (e.g., symbols). In such cases, base station 105-a may include an SSB ID of the SSB in the SSB itself, which may be used to indicate the SSB location of the SSB within the set of flexible SSB locations. Alternatively, an SSB may be transmitted by the base station 105-a in one of a set of candidate SSB locations, where each candidate SSB location corresponds or indicates a respective SSB ID. According to such techniques, base station 105-a may select a candidate SSB location of a set of candidate SSB locations that corresponds to an SSB ID for a given SSB. The base station 105-a may then transmit the SSB in the selected candidate SSB location. Upon reception of the SSB, the UE 115-a may decode the information contained within the SSB to determine the SSB ID, or may determine the location over which the SSB was transmitted and, based on the location, identify the corresponding SSB ID for the SSB.

Figure 3:
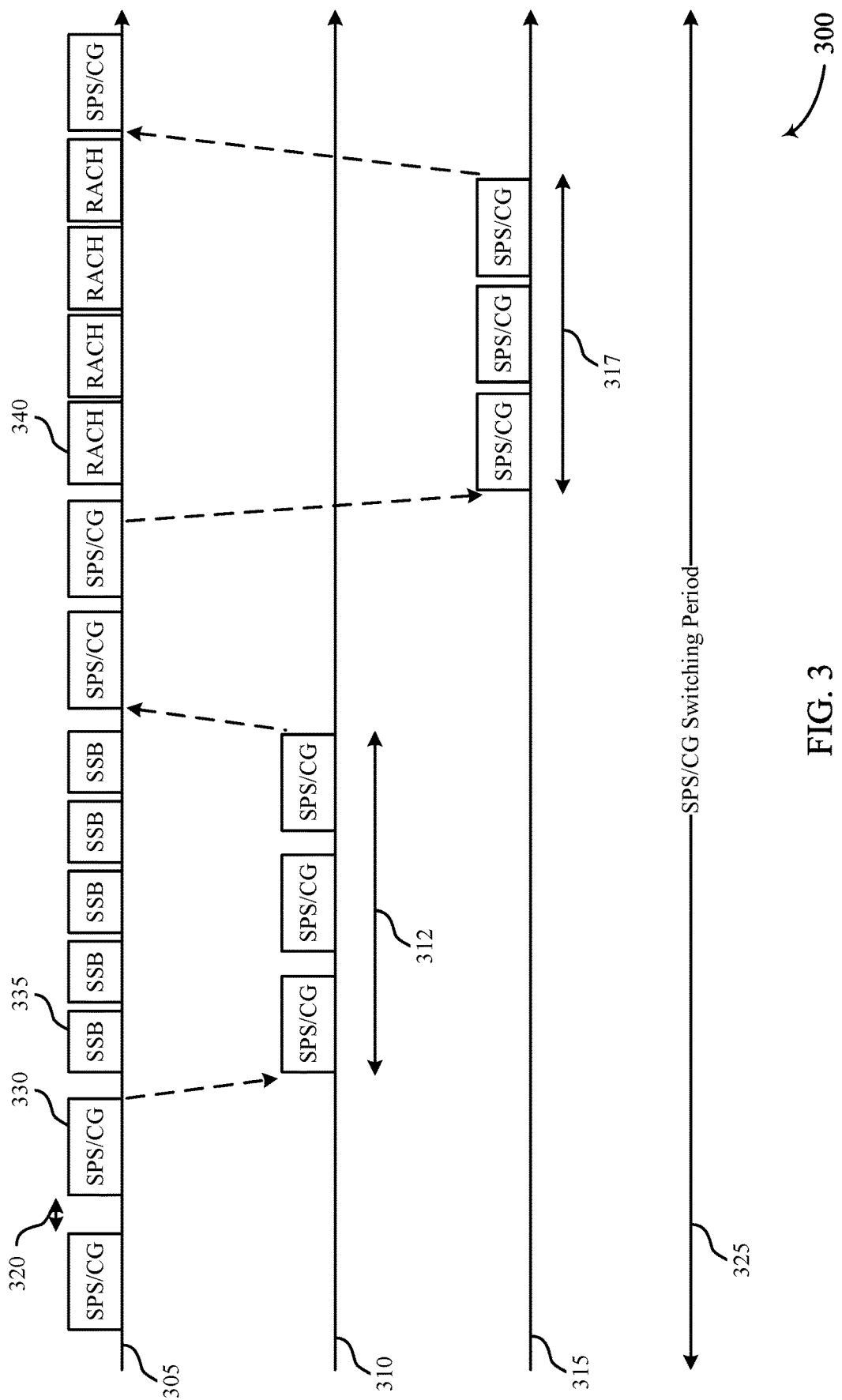
FIG. 3 illustrates an example of a resource switching pattern that supports resource conflict resolution in accordance with aspects of the present disclosure.

FIG. 3 illustrates an example of a resource switching pattern 300 that supports resource conflict resolution in accordance with aspects of the present disclosure. In some examples, resource switching pattern 300 may implement aspects of wireless communications systems 100 or 200. For example, a base station and a UE, as described in reference to FIGS. 1 and 2, may communicate according to resource switching pattern 300.

A base station and a UE may identify a resource switching pattern for switching SPS/CG transmissions 330 across component carriers 305, 310, and 315. The resource switching pattern may occur during a SPS/CG switching period 325. Switching SPS/CG transmissions 330 between component carriers 305, 310, and 315 may reduce or avoid the impact of periodic non-data resources (e.g., SSB 335 or RACH 340) on SPS/CG transmissions 330. In some examples, the base station may send a resource switching pattern configuration to the UE, which may indicate the resource switching pattern 300, along with an indication of the SPS/CG period 320 that indicates a time interval between subsequent or successive SPS/CG transmissions 330. In some examples, the base station may indicate the resource switching pattern 300 for each of component carrier 305, 310, and 315 in respective resource switching pattern configurations (e.g., transmitted via respective component carriers 305, 310, and 315). The UE may identify the resource switching pattern for any of the component carriers 305, 310, and 315 based on one or more of the resource switching pattern configuration(s).

According to the example of FIG. 3, a base station may allocate resources for transmission of an SSB burst containing SSBs 335 to a UE over component carrier 305. To avoid resources conflicts with SPS/CG transmissions 330, the resource switching pattern 300 may indicate that SPS/CG transmissions 330 are switched to component carrier 310 during time interval 312. Switching the SPS/CG transmissions 330 to component carrier 310 may allow SSBs 335 to be transmitted in component carrier 305 uninterrupted. In some examples, resources on component carrier 305 may be allocated for RACH 340. Accordingly, during the SPS/CG switching period 325, SPS/CG transmissions 330 may be switched to component carrier 315 during time interval 317. Such switching may allow transmissions via RACH 340 to be uninterrupted on component carrier 305. In some examples, component carrier 315 may be in FR1 and component carrier 305 may be in FR2. In other examples, component carrier 305, 310, or 315 may be in the same frequency range (e.g., FR1, FR2). Additionally or alternatively, the resource switching pattern may be preconfigured by a network node (e.g., a node of the core network 130 of FIG. 1) and may be known to both the UE and the base station (e.g., and therefore, may not be signaled via activation or deactivation downlink control information (DCI)) each time the component carrier is switched.

In some aspects, the base station may signal the resource switching pattern 300 to the UE. The resource switching pattern may be signaled via a semi persistent configuration (e.g., an SPS/CG configuration), which may have a configured ID and an anchoring cell ID. The configuration ID may indicate the switching configuration between component carriers 305, 310, and 315 (e.g., based on an index within a table or preconfigured configuration IDs supported by the base station or UE). The anchoring cell ID may correspond to the cell supporting component carrier 305. The SPS/CG configuration may indicate the SPS/CG period 320 and may indicate the resource switching pattern in the corresponding SPS/CG switching period 325. A separate SPS/CG configuration may be signaled per component carrier in the resource switching pattern. The base station may signal in a SPS/CG switching period 325, a component carrier specific time window within which the corresponding SPS/CG configuration is valid. The SPS/CG transmission resource switching pattern may have multiple flows simultaneously on different component carriers in some durations for improved reliability.

Figure 4A:
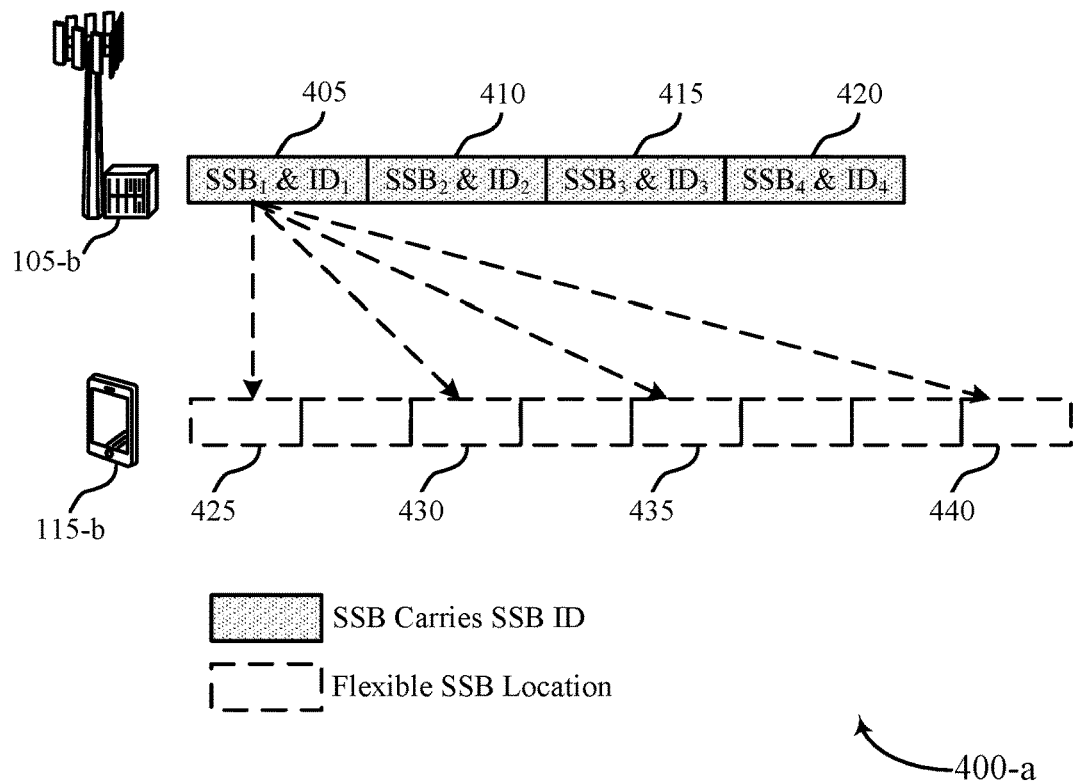
FIGS. 4A and 4B illustrate examples of an SSB configuration scheme that supports resource conflict resolution in accordance with aspects of the present disclosure.

FIG. 4A illustrates an example of an SSB configuration scheme 400-a that supports resource conflict resolution in accordance with aspects of the present disclosure. In some examples, SSB configuration scheme 400-a may implement aspects of wireless communications systems 100 or 200. For example, SSB configuration scheme 400-a may be implemented by a base station 105-b and UE 115-b, which may be examples of the corresponding devices described with reference to FIG. 1 or 2.

According to some aspects, a base station 105-b may transmit one or more SSBs 405, 410, 415, or 420 within an SSB burst to a UE 115-b in one or more flexible SSB locations 425, 430, 435, and 440. The flexible SSB locations 425, 430, 435, and 440 may include flexible SSB locations 425, 430, 435, and 440, among others within a radio frame, a subframe, a slot, a mini-slot, etc. In some examples, flexible SSB locations 425, 430, 435, and 440 may be symbols spanning a duration of 1 OFDM symbol in time, or the flexible SSB locations 425, 430, 435, and 440 may vary in time with respect to one another or may be based on the numerology (e.g., subcarrier spacing or tone spacing) used for transmission of the SSBs 405, 410, 415, or 420.

In some examples, the base station 105-b may transmit control signaling information to UE 115-b. The control signaling may indicate a time window within which UE 115-b may monitor for an SSB 405, 410, 415, or 420 within a radio frame. Base station 105-b may schedule the transmission of the SSB 405, 410, 415, or 420 within a portion of the radio frame not scheduled for IIoT traffic through the use of flexible SSB locations 425, 430, 435, and 440. For instance, base station 105-b may configure SSB 405 to contain synchronization information for $SSB_1$ and a corresponding $SSB\ ID_1$, which may be included in the SSB 405 when transmitted by the base station 105-b. The $SSB\ ID_1$ may indicate the flexible SSB location 425, 430, 435, or 440, which was selected by the base station 105-b for transmission of SSB 405. For instance, the SSB 405 may indicate an offset of the SSB 405 relative to a frame boundary of the radio frame. UE 115-b may also decode control information and data traffic of the radio frame based on the offset of the SSB and the frame boundary.

In some examples, rather than a fixed SSB location within an SSB burst of a radio frame scheduled for the SSB burst, the SSB location for a given SSB ID of the SSB burst may be flexible within a time window. By selecting a flexible SSB location of the flexible SSB locations 425, 430, 435, and 440 for transmission of SSB 405, the base station 105-b may avoid selecting an SSB location of the flexible SSB locations 425, 430, 435, and 440 that overlaps with SPS/CG transmission(s) via the same component carrier used for the SSB 405. Using techniques of FIG. 4A, base station 105-b may distribute SSBs 405, 410, 415, and 420 to avoid conflicts with SPS/CG transmissions that may be scheduled in one or more of the flexible SSB locations 425, 430, 435, and 440.

Similar selection techniques may be utilized by the base station 105-b for selecting locations of the flexible SSB locations 425, 430, 435, and 440 for transmission of SSBs 410, 415, and 420. For instance, base station 105-b may configure SSB 410 to contain $SSB_2$ and the corresponding $SSB\ ID_2$, SSB 415 to contain $SSB_3$ and the corresponding $SSB\ ID_3$, and SSB 420 to contain $SSB_4$ and the corresponding $SSB\ ID_4$. Base station 105-b may transmit SSBs 410, 415, and 420 in the SSB burst to flexible SSB locations (e.g., 425, 430, 435, 440) as each contains a corresponding SSB ID.

Figure 4B:
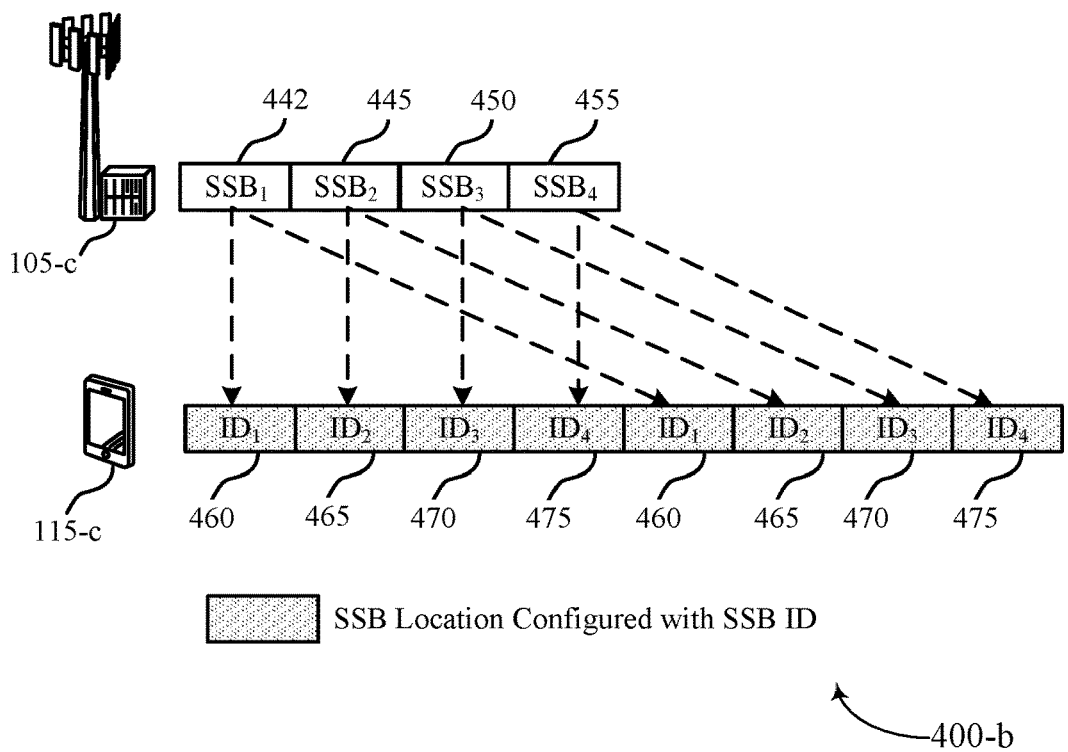

FIG. 4B illustrates an example of an SSB configuration scheme 400-b that supports resource conflict resolution in accordance with aspects of the present disclosure. In some examples, SSB configuration scheme 400-b may implement aspects of wireless communications systems 100 or 200. For example, SSB configuration scheme 400-b may be implemented by a base station 105-c and UE 115-c, which may be examples of the corresponding devices described with reference to FIG. 1 or 2.

According to some aspects, a base station 105-c may transmit one or more SSBs 442, 445, 450, or 455 within an SSB burst to a UE 115-c in one or more candidate SSB locations. The candidate SSB locations may include candidate SSB locations 460, 465, 470, and 475 within a radio frame, a subframe, a slot, a mini-slot, etc. In some examples, candidate SSB locations 460, 465, 470, and 475 may be symbols spanning a duration of 1 OFDM symbol in time, or the candidate SSB locations 460, 465, 470, and 475 may vary in time with respect to one another or may be based on the numerology (e.g., subcarrier spacing or tone spacing) used for transmission of the SSBs 442, 445, 450, 455.

In some examples, the UE 115-c may receive control information from base station 105-c that indicates a time window which UE 115-c may monitor for an SSB 442, 445, 450, 455 within a radio frame. UE 115-c may decode the SSB 442, 445, 450, 455 from the time window.

In some examples, each candidate SSB location 460, 465, 470, and 475 may be associated with, configured with, or otherwise indicate a respective SSB ID. For example, SSB locations 460 may indicate SSB ID$_1$, SSB locations 465 may indicate SSB ID$_2$, SSB locations 470 may indicate SSB ID$_3$, and SSB locations 475 may indicate SSB ID$_4$. Base station 105-*c* may transmit SSB 442 containing SSB$_1$ via one or more of the SSB locations 460 configured with corresponding SSB ID$_1$. In such cases, the SSB locations 460 associated with SSB ID$_1$ may be considered fixed SSB locations as base station 105-*c* may select from the SSB locations 460 for transmission of SSB 442. Similarly, base station 105-*c* may transmit SSB 445 containing SSB$_2$ via one or more of SSB locations 465 indicating corresponding SSB ID$_2$, SSB 450 containing SSB$_3$ via one or more of SSB locations 470 indicating corresponding SSB ID$_3$, and SSB 455 containing SSB$_4$ via one or more of SSB locations 475 indicating corresponding SSB ID$_4$.

In some examples, each candidate SSB location may be a fixed SSB location in the SSB burst set pattern. In some examples, there may be total number of candidate SSB locations within a time window, and the base station 105-*c* may use a subset of the total number of SSB locations for SSB transmissions. For instance, there may be a total of 200 candidate SSB locations, and the base station 105-*c* may be configured to utilize 64 of the candidate SSB locations for transmission of an SSB burst. The SSB indication by the SSB location may allow the SSB to carry fewer bits as the SSB may not include the SSB ID.

Figure 5:
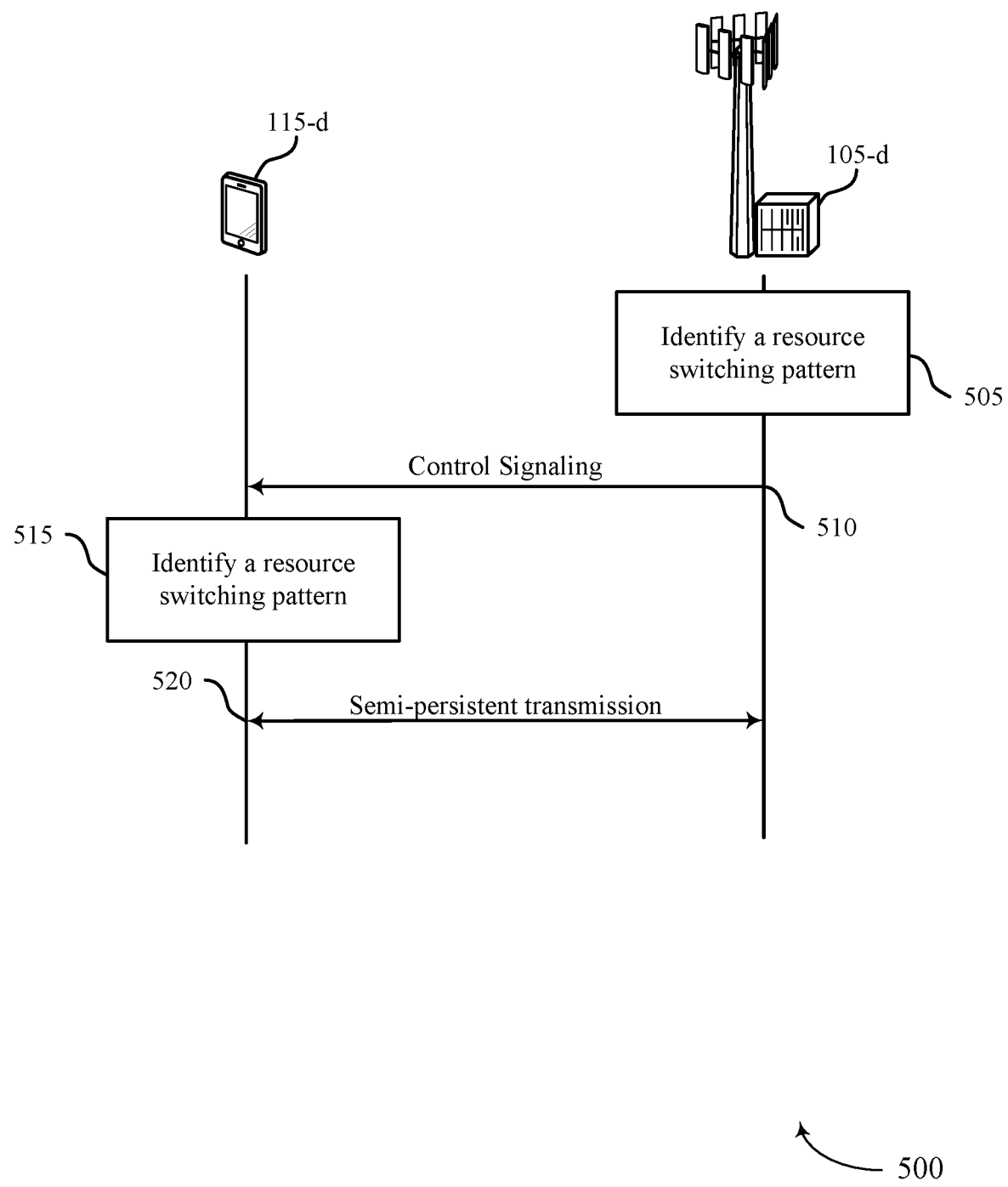
FIG. 5 illustrates an example of a process flow that supports resource conflict resolution in accordance with aspects of the present disclosure.

FIG. 5 illustrates an example of a process flow 500 that supports resource conflict resolution in accordance with aspects of the present disclosure. In some examples, process flow 500 may implement aspects of wireless communications systems 100. or 200. For example, process flow 500 may include base station 105-*d* and UE 115-*d*, which may be examples of the corresponding devices described with reference to FIG. 1 or 2.

At 505, base station 105-*d* may identify a resource switching pattern for communication of SPS/CG transmissions with UE 115-*d*. In some examples, the resource switching pattern may indicate multiple frequency resources (e.g., component carriers) to be used for communication of SPS/CG transmissions. The resource switching pattern may be determined by the base station 105-*d* or may be preconfigured by the network (e.g., by a node of the core network 130 of FIG. 1). In some cases, the resource switching pattern may indicate time intervals over which SPS/CG transmissions are to be communicated on a first component carrier and other time intervals over which SPS/CG transmissions are to be communicated on a second, different component carrier. The time intervals may be selected or otherwise identified by the base station 105-*d* in order to avoid conflict by scheduling SPS/CG transmissions via time-frequency resources (e.g., overlapping time intervals on a same component carrier) as control traffic such as SSB or RACH transmissions.

At 510, base station 105-*d* may transmit control signaling to UE 115-*d*. The control signaling may configure UE 115-*d* with component carriers and a resource allocation of SPS/CG transmissions. In some examples, the control signaling may include an indication of the resource switching pattern (e.g., the control signaling may include a resource switching configuration that indicates the resource switching pattern). Alternatively, an indication of the resource switching pattern may be transmitted by the base station 105-*d* separate (e.g., in a separate message or via different time-frequency resources) from the control signaling 510. The indication of the resource switching pattern may, in some cases, including an SPS/CG period indicating a time period between successive SPS/CG transmissions on one or more component carriers.

At 515, UE 115-*d* may identify a resource switching pattern for switching SPS/CG transmissions between component carriers. For example, the UE 115-*d* may identify the resource switching pattern based on control signaling transmitted on 510. Additionally or alternatively, the UE 115-*d* may identify the resource switching pattern based on a resource switching pattern configuration or an SPS/CG configuration, which may indicate resources allocated for SPS/CG transmissions or resources allocated for control information such as SSB or RACH transmissions. In other examples, the resource switching pattern may be predefined, preconfigured, or otherwise known to both the UE 115-*d* and base station 105-*d*.

At 520, base station 105-*d* and UE 115-*d* may communicate SPS/CG traffic on one or more carriers according to the resource switching pattern. In one example, the UE 115-*d* may transmit an uplink SPS message to the base station 105-*d*, or the UE may receive a downlink SPS message from the base station 105-*d*, during a first time interval via a first component carrier. Thereafter, the UE 115-*d* may transmit an uplink message based on a CG for the UE 115-*d*, or the base station 105-*d* may transmit a downlink message based on a CG for the UE 115-*d*, on another component carrier different than the first component carrier and during a second time interval. In some cases, the second time interval may overlap in time with resources allocated for control information such as RACH messages of SSBs scheduled for transmission on the first component carrier.

Figure 6:
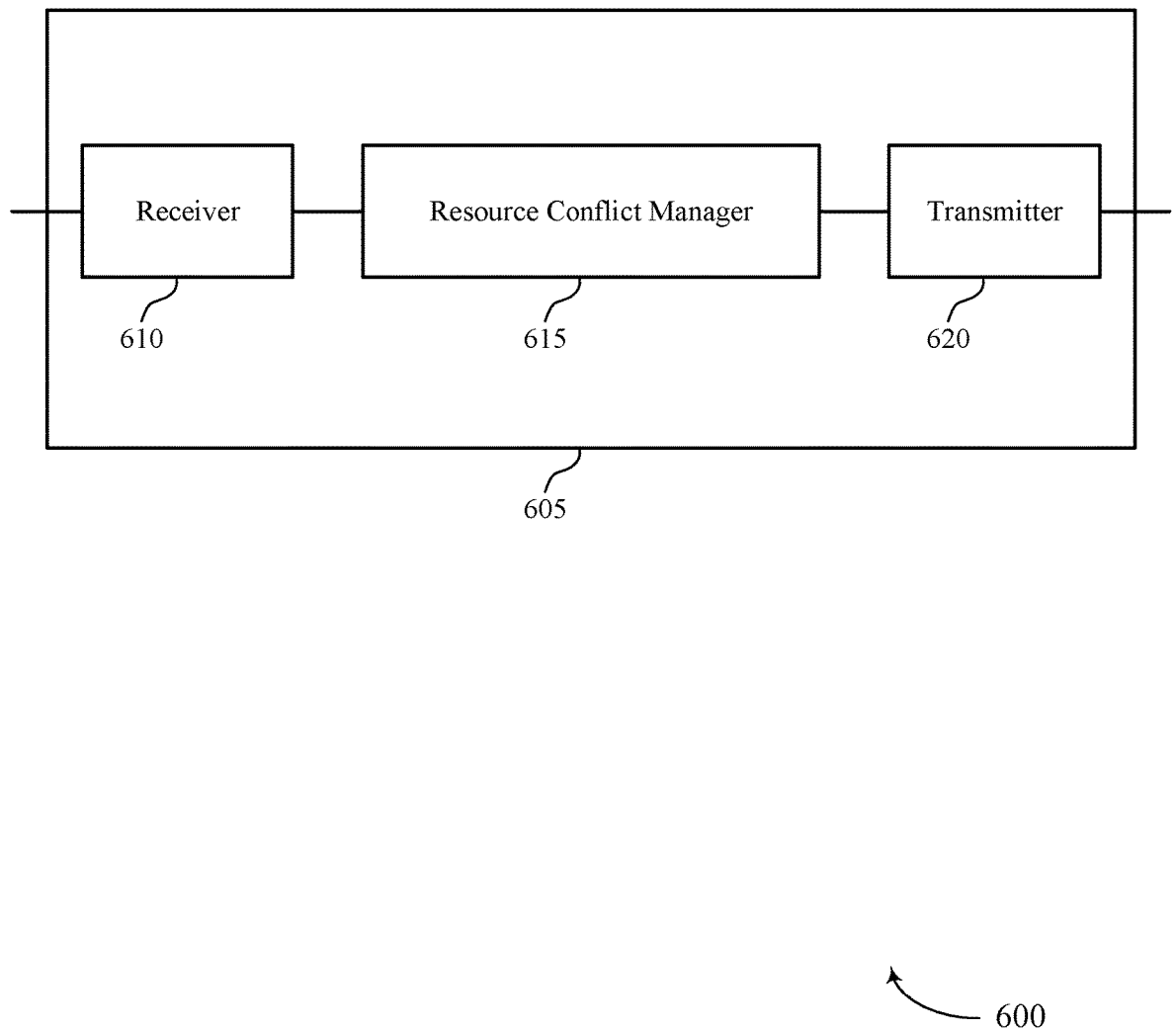
FIGS. 6 and 7 show diagrams of devices that support resource conflict resolution in accordance with aspects of the present disclosure.

FIG. 6 shows a diagram 600 of a device 605 that supports resource conflict resolution in accordance with aspects of the present disclosure. The device 605 may be an example of aspects of a UE 115 as described herein. The device 605 may include a receiver 610, a resource conflict manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to resource conflict resolution, etc.). Information may be passed on to other components of the device 605. The receiver 610 may be an example of aspects of the transceiver 920 described with reference to FIG. 9. The receiver 610 may utilize a single antenna or a set of antennas.

The resource conflict manager 615 may receive control signaling that indicates a set of frequency resources for communicating with a base station and a resource allocation for a semi-persistent transmission using a first frequency resource of the set of frequency resources, identify a resource switching pattern for switching from the first frequency resource to a different frequency resource of the set of frequency resources, and communicate the semi-persistent transmission with the base station via a second frequency resource of the set of frequency resources based on the resource switching pattern.

In some cases, the resource conflict manager 615 may also receive control signaling that indicates a time window within which the UE is to monitor for an SSB of a radio frame, decode the SSB from the time window, the SSB indicating an offset of the SSB relative to a frame boundary of the radio frame, and decode control information, data traffic, or both, of the radio frame based on the offset and the frame boundary.

In some examples, the resource conflict manager 615 may also receive control signaling that indicates a set of candidate locations for an SSB within a radio frame, decode the SSB at a first candidate location of the set of candidate locations, and decode control information, data traffic, or both, of the radio frame based on a frame boundary of the radio frame identified relative to the first candidate location. The resource conflict manager 615 may be an example of aspects of the resource conflict manager 910 described herein.

The resource conflict manager 615, or its sub-components, may be implemented in hardware, code (e.g., software or firmware) executed by a processor, or any combination thereof. If implemented in code executed by a processor, the functions of the resource conflict manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The resource conflict manager 615, or its sub-components, may be physically located at various positions, including being distributed such that portions of functions are implemented at different physical locations by one or more physical components. In some examples, the resource conflict manager 615, or its sub-components, may be a separate and distinct component in accordance with various aspects of the present disclosure. In some examples, the resource conflict manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The resource conflict manager 615 as described herein may be implemented to realize one or more potential advantages. Various implementations may reduce the impact of prevent resource conflict, dropped transmissions, and communication interference associated with SPS/CG transmissions and periodically scheduled control traffic. As a result, a device may reduce its power consumption due to performing less retransmissions, and user experience may be improved. In one example, the resource conflict manager 615 may utilize a resource switching pattern, flexible SSB locations, or candidate SSB locations to provide improved flexibility for scheduling traffic and non-traffic resources (e.g., control resources) used for communication between wireless devices in a wireless communications system.

Figure 7:
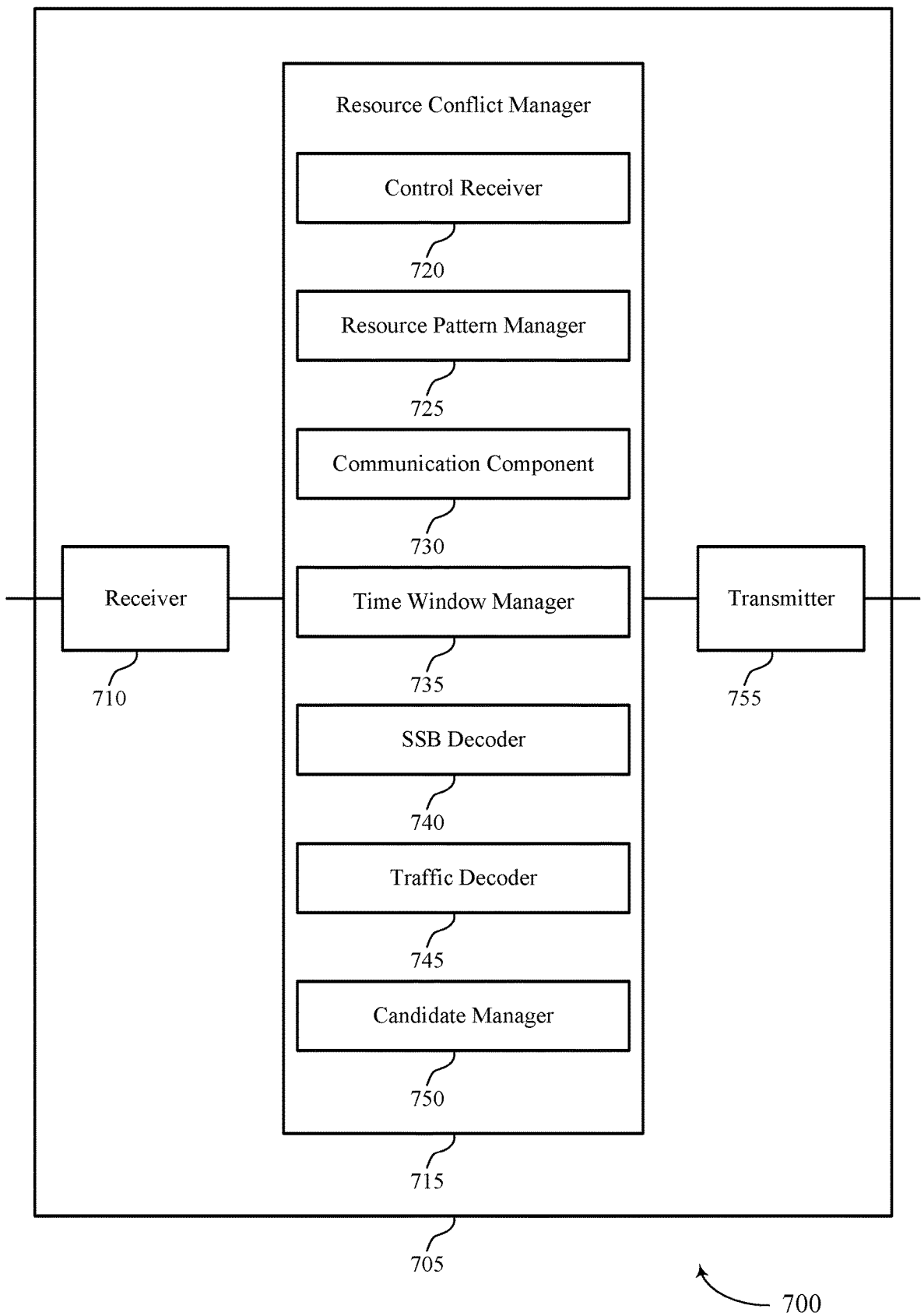

FIG. 7 shows a diagram 700 of a device 705 that supports resource conflict resolution in accordance with aspects of the present disclosure. The device 705 may be an example of aspects of a device 605, or a UE 115 as described herein. The device 705 may include a receiver 710, a resource conflict manager 715, and a transmitter 755. The device 705 may also include a processor. Each of these components may be in communication with one another (e.g., via one or more buses).

The receiver 710 may receive information such as packets, user data, or control information associated with various information channels (e.g., control channels, data channels, and information related to resource conflict resolution, etc.). Information may be passed on to other components of the device 705. The receiver 710 may be an example of aspects of the transceiver 920 described with reference to FIG. 9. The receiver 710 may utilize a single antenna or a set of antennas.

The resource conflict manager 715 may be an example of aspects of the resource conflict manager 615 as described herein. The resource conflict manager 715 may include a control receiver 720, a resource pattern manager 725, a communication component 730, a time window manager 735, an SSB decoder 740, a traffic decoder 745, and a candidate manager 750. The resource conflict manager 715 may be an example of aspects of the resource conflict manager 910 described herein.

The control receiver 720 may receive control signaling that indicates a set of frequency resources for communicating with a base station and a resource allocation for a semi-persistent transmission using a first frequency resource of the set of frequency resources.

The resource pattern manager 725 may identify a resource switching pattern for switching from the first frequency resource to a different frequency resource of the set of frequency resources.

The communication component 730 may communicate the semi-persistent transmission with the base station via a second frequency resource of the set of frequency resources based on the resource switching pattern.

The time window manager 735 may receive control signaling that indicates a time window within which the UE is to monitor for an SSB of a radio frame.

The SSB decoder 740 may decode the SSB from the time window, the SSB indicating an offset of the SSB relative to a frame boundary of the radio frame.

The traffic decoder 745 may decode control information, data traffic, or both, of the radio frame based on the offset and the frame boundary.

The candidate manager 750 may receive control signaling that indicates a set of candidate locations for an SSB within a radio frame.

The SSB decoder 740 may decode the SSB at a first candidate location of the set of candidate locations.

The traffic decoder 745 may decode control information, data traffic, or both, of the radio frame based on a frame boundary of the radio frame identified relative to the first candidate location.

The transmitter 755 may transmit signals generated by other components of the device 705. In some examples, the transmitter 755 may be collocated with a receiver 710 in a transceiver module. For example, the transmitter 755 may be an example of aspects of the transceiver 920 described with reference to FIG. 9. The transmitter 755 may utilize a single antenna or a set of antennas.

Figure 8:
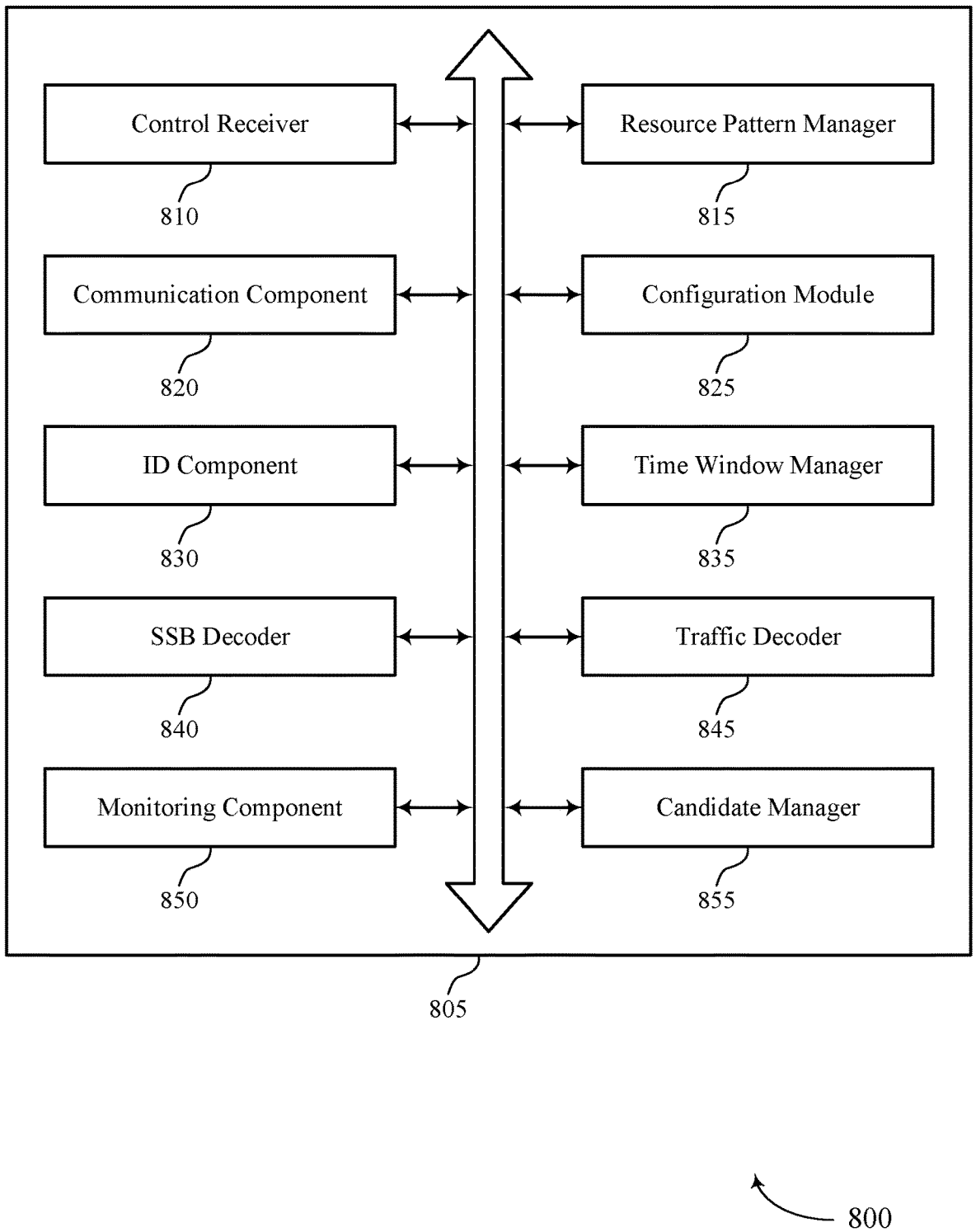
FIG. 8 shows a diagram of a resource conflict manager that supports resource conflict resolution in accordance with aspects of the present disclosure.

FIG. 8 shows a diagram 800 of a resource conflict manager 805 that supports resource conflict resolution in accordance with aspects of the present disclosure. The resource conflict manager 805 may be an example of aspects of a resource conflict manager 615, a resource conflict manager 715, or a resource conflict manager 910 described herein. The resource conflict manager 805 may include a control receiver 810, a resource pattern manager 815, a communication component 820, a configuration module 825, an ID component 830, a time window manager 835, an SSB decoder 840, a traffic decoder 845, a monitoring component 850, and a candidate manager 855. Each of these modules may communicate, directly or indirectly, with one another (e.g., via one or more buses).

The control receiver 810 may receive control signaling that indicates a set of frequency resources for communicating with a base station and a resource allocation for a semi-persistent transmission using a first frequency resource of the set of frequency resources. In some cases, the set of frequency resources includes one or more component carriers. In some cases, the semi-persistent transmission conveys data. In some cases, the semi-persistent transmission includes a periodic transmission. In some cases, the semi-persistent transmission includes a downlink transmission based on semi-persistent scheduling. In some cases, the semi-persistent transmission includes an uplink transmission based on a CG.

The resource pattern manager 815 may identify a resource switching pattern for switching from the first frequency resource to a different frequency resource of the set of frequency resources. In some examples, the resource pattern manager 815 may receive an SSB from the base station or transmitting a random access message to the base station. In some examples, the resource pattern manager 815 may receive, from the base station, a resource switching pattern configuration that indicates the resource switching pattern. In some examples, the resource pattern manager 815 may receive, in the resource switching pattern configuration, an indication of a time period that occurs between adjacent communication occasions for communicating the semi-persistent transmission.

In some cases, the resource switching pattern is determined at least to avoid the semi-persistent transmission partially overlapping in time with control traffic. In some cases, the resource switching pattern is associated with a respective resource switching period of the resource switching pattern configuration.

The communication component 820 may communicate the semi-persistent transmission with the base station via a second frequency resource of the set of frequency resources based on the resource switching pattern. In some examples, the communication component 820 may communicate the semi-persistent transmission with the base station via a third frequency resource of the set of frequency resources based on the resource switching pattern for the semi-persistent transmission.

The time window manager 835 may receive control signaling that indicates a time window within which the UE is to monitor for an SSB of a radio frame.

The SSB decoder 840 may decode the SSB from the time window, the SSB indicating an offset of the SSB relative to a frame boundary of the radio frame. In some examples, the SSB decoder 840 may decode the SSB at a first candidate location of the set of candidate locations.

The traffic decoder 845 may decode control information, data traffic, or both, of the radio frame based on the offset and the frame boundary. In some examples, the traffic decoder 845 may decode control information, data traffic, or both, of the radio frame based on a frame boundary of the radio frame identified relative to the first candidate location.

The candidate manager 855 may receive control signaling that indicates a set of candidate locations for an SSB within a radio frame.

The configuration module 825 may receive a semi-persistent transmission configuration for each respective component carrier of the set of frequency resources. In some cases, the semi-persistent transmission configuration for each respective component carrier at least includes a time period that occurs between adjacent communication occasions for the semi-persistent transmission on the respective component carrier. In some cases, the semi-persistent transmission configuration for each respective component carrier at least includes a time duration, where the semi-persistent transmission configuration for the respective component carrier is valid.

The ID component 830 may receive a configuration ID and an anchoring cell ID associated with the resource switching pattern in the resource switching pattern configuration. In some cases, the anchoring cell ID corresponds to a cell supporting the first frequency resource. In some cases, the configuration ID indicates the switching from the first frequency resource to the different frequency resource.

The monitoring component 850 may monitor a set of flexible locations within the time window for a set of SSBs including the SSB based on the control signaling. In some examples, the monitoring component 850 may receive the SSB at a first flexible location of the set of flexible locations based on the monitoring, where the SSB indicates the first flexible location. In some examples, the monitoring component 850 may receive the SSB at a first flexible location of the set of flexible locations based on the monitoring, where the first flexible location indicates an SSB ID associated with the SSB. In some examples, the monitoring component 850 may monitor the set of candidate locations for the SSB based on the control signaling, where each of the set of candidate locations is associated with a respective SSB ID. In some examples, the monitoring component 850 may receive the SSB at the first candidate location based on the monitoring. In some examples, the monitoring component 850 may monitor a subset of the set of candidate locations for the SSB, where each of the subset of the set of candidate locations is associated with an SSB ID that corresponds to the SSB.

Figure 9:
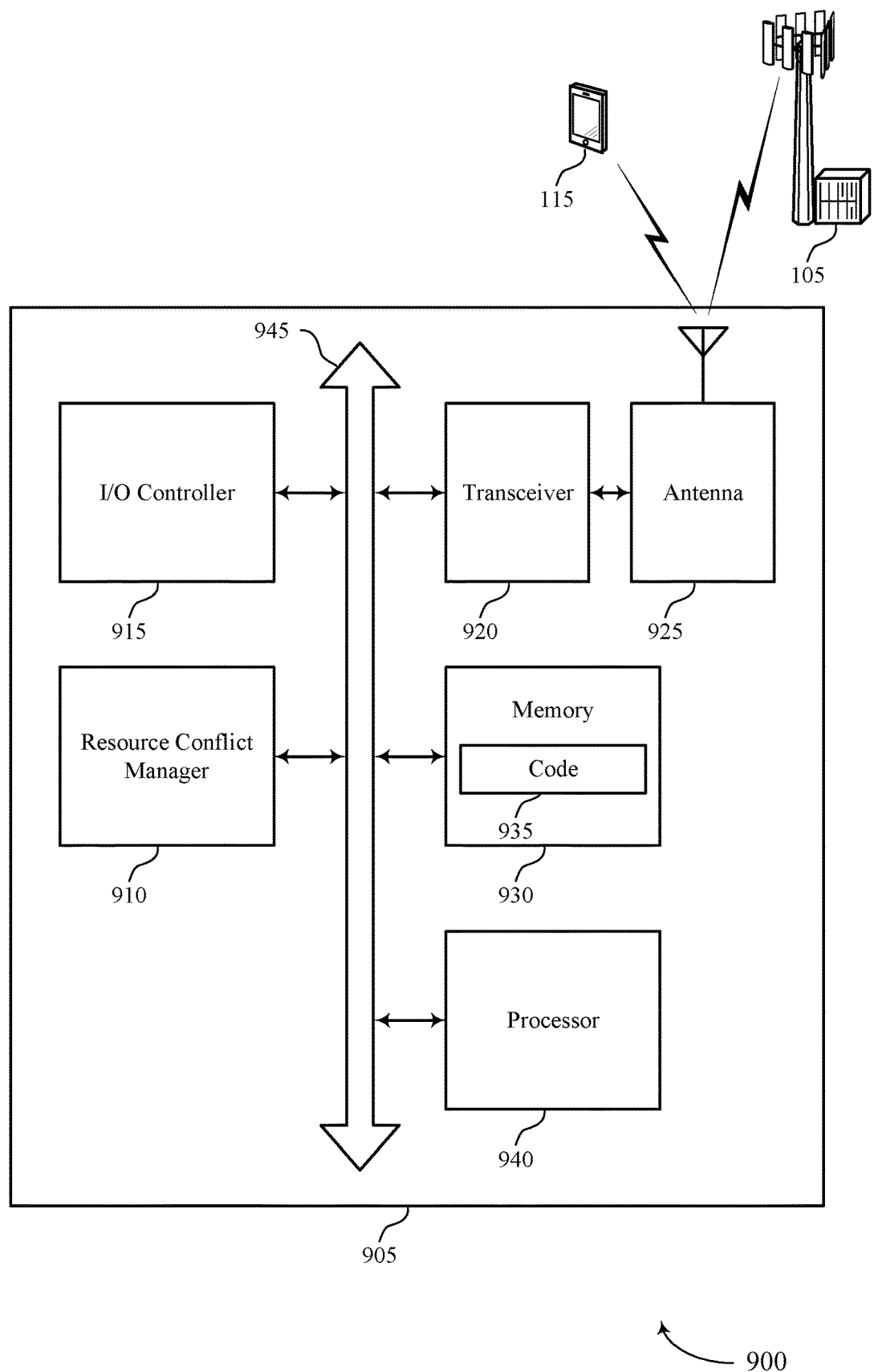
FIG. 9 shows a diagram of a system including a device that supports resource conflict resolution in accordance with aspects of the present disclosure.

FIG. 9 shows a diagram of a system 900 including a device 905 that supports resource conflict resolution in accordance with aspects of the present disclosure. The device 905 may be an example of or include the components of device 605, device 705, or a UE 115 as described herein. The device 905 may include components for bi-directional voice and data communications including components for transmitting and receiving communications, including a resource conflict manager 910, an I/O controller 915, a transceiver 920, an antenna 925, memory 930, and a processor 940. These components may be in electronic communication via one or more buses (e.g., bus 945).

The resource conflict manager 910 may receive control signaling that indicates a set of frequency resources for communicating with a base station and a resource allocation for a semi-persistent transmission using a first frequency resource of the set of frequency resources, identify a resource switching pattern for switching from the first frequency resource to a different frequency resource of the set of frequency resources, and communicate the semi-persistent transmission with the base station via a second frequency resource of the set of frequency resources based on the resource switching pattern.

The resource conflict manager 910 may also receive control signaling that indicates a time window within which the UE is to monitor for an SSB of a radio frame, decode the SSB from the time window, the SSB indicating an offset of the SSB relative to a frame boundary of the radio frame, and decode control information, data traffic, or both, of the radio frame based on the offset and the frame boundary.

The resource conflict manager 910 may also receive control signaling that indicates a set of candidate locations for an SSB within a radio frame, decode the SSB at a first candidate location of the set of candidate locations, and decode control information, data traffic, or both, of the radio frame based on a frame boundary of the radio frame identified relative to the first candidate location.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the device 905 may include a single antenna 925. However, in some cases, the device 905 may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting resource conflict resolution).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
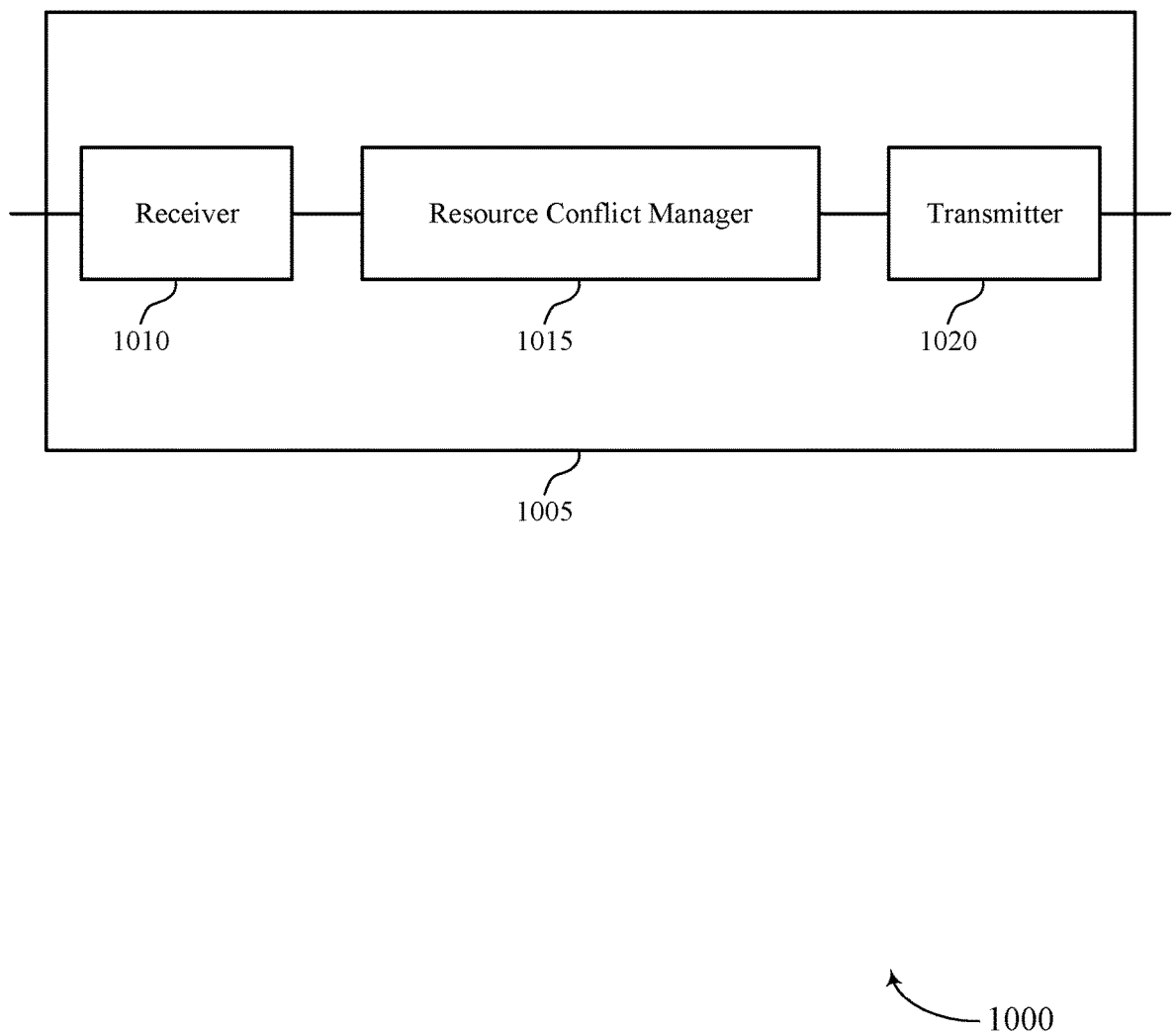
FIGS. 10 and 11 show diagrams of devices that support resource conflict resolution in accordance with aspects of the present disclosure.

FIG. 10 shows a diagram 1000 of a device 1005 that supports resource conflict resolution in accordance with aspects of the present disclosure. The device 1005 may be an example of aspects of a base station 105 as described herein. The device 1005 may include a receiver 1010, a resource conflict manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to resource conflict resolution, etc.). Information may be passed on to other components of the device 1005. The receiver 1010 may be an example of aspects of the transceiver 1320 described with reference to FIG. 13. The receiver 1010 may utilize a single antenna or a set of antennas.

The resource conflict manager 1015 may transmit control signaling for configuring a UE with a set of frequency resources for communicating with the base station and a resource allocation for a semi-persistent transmission via a first frequency resource of the set of frequency resources, identify a resource switching pattern for switching from the first frequency resource to a different frequency resource of the set of frequency resources, and communicate the semi-persistent transmission with the UE via a second frequency resource of the set of frequency resources based on the resource switching pattern.

The resource conflict manager 1015 may also transmit control signaling that indicates a time window within which a UE is to monitor for an SSB within a radio frame, schedule transmission of data traffic within the radio frame and transmission of the SSB within a portion of the radio frame not scheduled for transmission of data traffic, and transmit, within the time window, the SSB that indicates a relationship between a location of the SSB and a boundary of the radio frame.

The resource conflict manager 1015 may also transmit control signaling that indicates a set of candidate locations for an SSB within a radio frame, schedule transmission of the SSB within a first candidate location of the set of candidate locations of the radio frame that does not overlap with a resource of the radio frame scheduled for transmission of data traffic, and transmit the SSB at the first candidate location within the radio frame based on the scheduling. The resource conflict manager 1015 may be an example of aspects of the resource conflict manager 1310 described herein.

The resource conflict manager 1015, or its sub-components, may be implemented in hardware, code (e.g., software or firmware) executed by a processor, or any combination thereof. If implemented in code executed by a processor, the functions of the resource conflict manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The resource conflict manager 1015, or its sub-components, may be physically located at various positions, including being distributed such that portions of functions are implemented at different physical locations by one or more physical components. In some examples, the resource conflict manager 1015, or its sub-components, may be a separate and distinct component in accordance with various aspects of the present disclosure. In some examples, the resource conflict manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
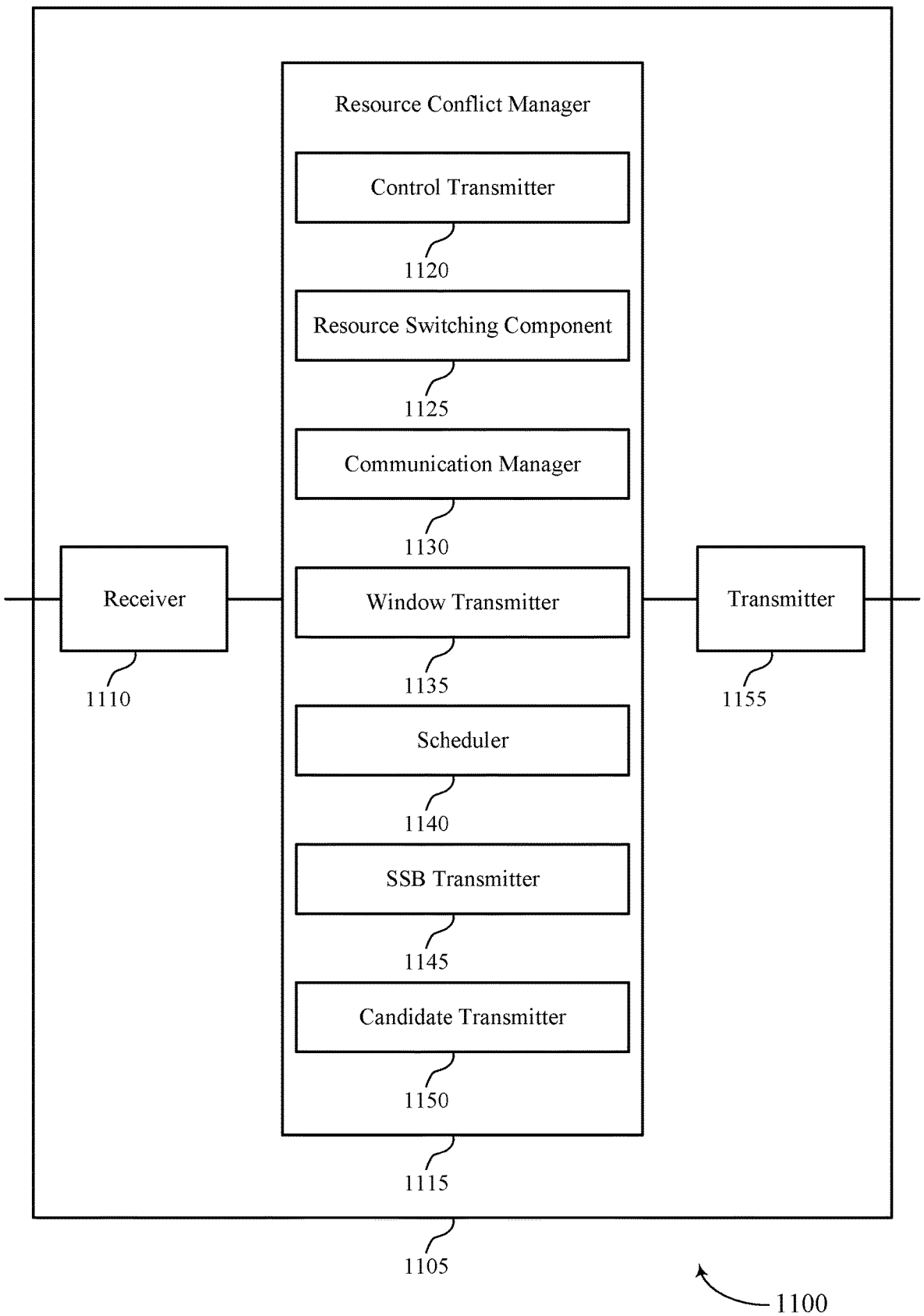

FIG. 11 shows a diagram 1100 of a device 1105 that supports resource conflict resolution in accordance with aspects of the present disclosure. The device 1105 may be an example of aspects of a device 1005, or a base station 105 as described herein. The device 1105 may include a receiver 1110, a resource conflict manager 1115, and a transmitter 1155. The device 1105 may also include a processor. Each of these components may be in communication with one another (e.g., via one or more buses).

The receiver 1110 may receive information such as packets, user data, or control information associated with various information channels (e.g., control channels, data channels, and information related to resource conflict resolution, etc.). Information may be passed on to other components of the device 1105. The receiver 1110 may be an example of aspects of the transceiver 1320 described with reference to FIG. 13. The receiver 1110 may utilize a single antenna or a set of antennas.

The resource conflict manager 1115 may be an example of aspects of the resource conflict manager 1015 as described herein. The resource conflict manager 1115 may include a control transmitter 1120, a resource switching component 1125, a communication manager 1130, a window transmitter 1135, a scheduler 1140, an SSB transmitter 1145, and a candidate transmitter 1150. The resource conflict manager 1115 may be an example of aspects of the resource conflict manager 1310 described herein.

The control transmitter 1120 may transmit control signaling for configuring a UE with a set of frequency resources for communicating with the base station and a resource allocation for a semi-persistent transmission via a first frequency resource of the set of frequency resources.

The resource switching component 1125 may identify a resource switching pattern for switching from the first frequency resource to a different frequency resource of the set of frequency resources.

The communication manager 1130 may communicate the semi-persistent transmission with the UE via a second frequency resource of the set of frequency resources based on the resource switching pattern.

The window transmitter 1135 may transmit control signaling that indicates a time window within which a UE is to monitor for an SSB within a radio frame.

The scheduler 1140 may schedule transmission of data traffic within the radio frame and transmission of the SSB within a portion of the radio frame not scheduled for transmission of data traffic.

The SSB transmitter 1145 may transmit, within the time window, the SSB that indicates a relationship between a location of the SSB and a boundary of the radio frame.

The candidate transmitter 1150 may transmit control signaling that indicates a set of candidate locations for an SSB within a radio frame.

The scheduler 1140 may schedule transmission of the SSB within a first candidate location of the set of candidate locations of the radio frame that does not overlap with a resource of the radio frame scheduled for transmission of data traffic.

The SSB transmitter 1145 may transmit the SSB at the first candidate location within the radio frame based on the scheduling.

The transmitter 1155 may transmit signals generated by other components of the device 1105. In some examples, the transmitter 1155 may be collocated with a receiver 1110 in a transceiver module. For example, the transmitter 1155 may be an example of aspects of the transceiver 1320 described with reference to FIG. 13. The transmitter 1155 may utilize a single antenna or a set of antennas.

Figure 12:
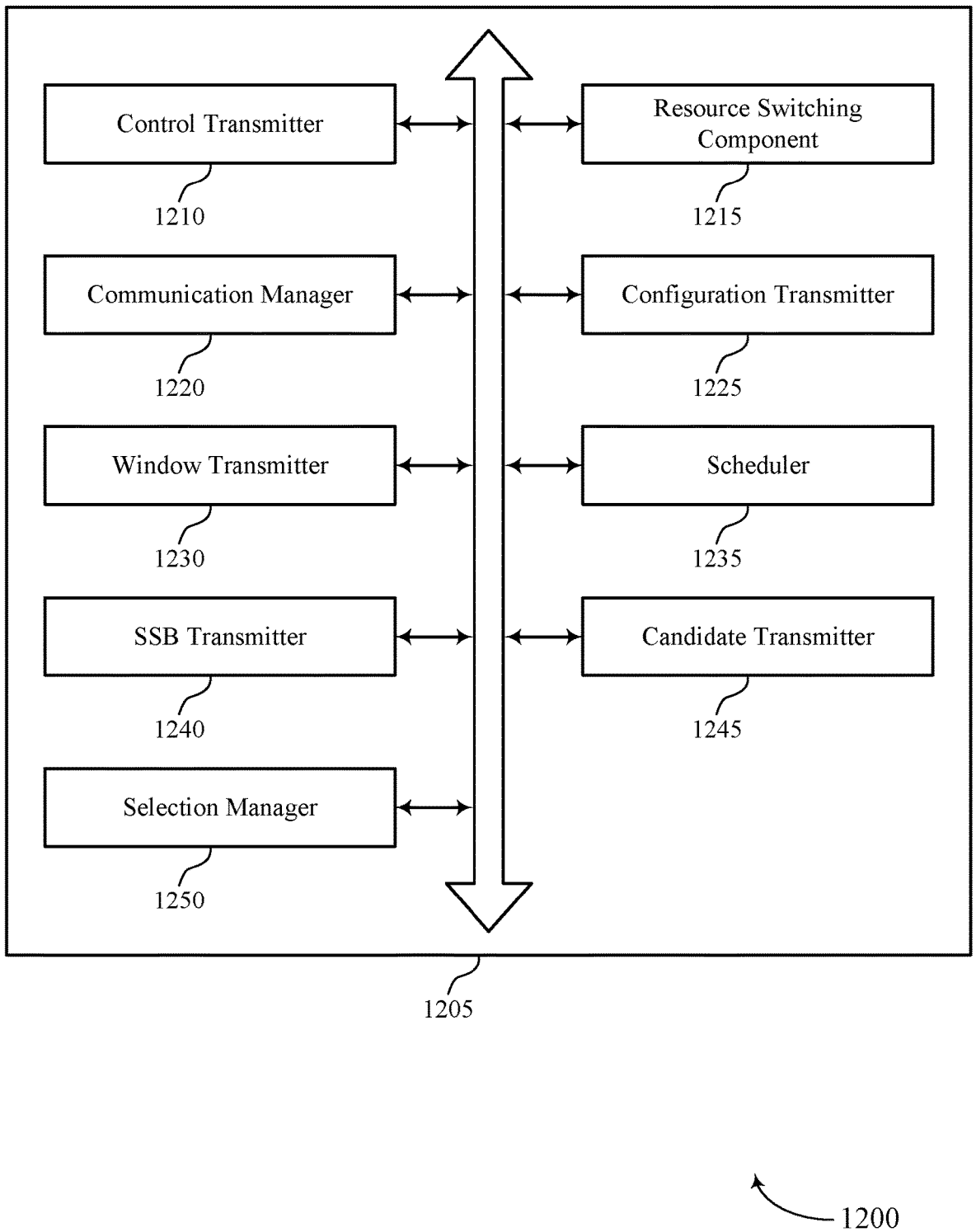
FIG. 12 shows a diagram of a resource conflict manager that supports resource conflict resolution in accordance with aspects of the present disclosure.

FIG. 12 shows a diagram 1200 of a resource conflict manager 1205 that supports resource conflict resolution in accordance with aspects of the present disclosure. The resource conflict manager 1205 may be an example of aspects of a resource conflict manager 1015, a resource conflict manager 1115, or a resource conflict manager 1310 described herein. The resource conflict manager 1205 may include a control transmitter 1210, a resource switching component 1215, a communication manager 1220, a configuration transmitter 1225, a window transmitter 1230, a scheduler 1235, an SSB transmitter 1240, a candidate transmitter 1245, and a selection manager 1250. Each of these modules may communicate, directly or indirectly, with one another (e.g., via one or more buses).

The control transmitter 1210 may transmit control signaling for configuring a UE with a set of frequency resources for communicating with the base station and a resource allocation for a semi-persistent transmission via a first frequency resource of the set of frequency resources. In some cases, the set of frequency resources includes one or more component carriers. In some cases, the semi-persistent transmission conveys data. In some cases, the semi-persistent transmission includes a periodic transmission. In some cases, the semi-persistent transmission includes a downlink transmission based on semi-persistent scheduling. In some cases, the semi-persistent transmission includes an uplink transmission based on a CG.

The resource switching component 1215 may identify a resource switching pattern for switching from the first frequency resource to a different frequency resource of the set of frequency resources. In some examples, the resource switching component 1215 may receive an SSB from the base station or transmitting a random access message to the base station. In some examples, the resource switching component 1215 may transmit, to the UE, a resource switching pattern configuration that indicates the resource switching pattern.

In some examples, the resource switching component 1215 may transmit, in the resource switching pattern configuration, an indication of a time period that occurs between adjacent communication occasions for communicating the semi-persistent transmission. In some cases, the resource switching pattern is determined at least to avoid the semi-persistent transmission partially overlapping in time with control traffic. In some cases, the resource switching pattern is associated with a respective resource switching period of the resource switching pattern configuration.

The communication manager 1220 may communicate the semi-persistent transmission with the UE via a second frequency resource of the set of frequency resources based on the resource switching pattern. In some examples, the communication manager 1220 may communicate the semi-persistent transmission with the UE via a third frequency resource of the set of frequency resources based on the resource switching pattern for the semi-persistent transmission.

The window transmitter 1230 may transmit control signaling that indicates a time window within which a UE is to monitor for an SSB within a radio frame.

The scheduler 1235 may schedule transmission of data traffic within the radio frame and transmission of the SSB within a portion of the radio frame not scheduled for transmission of data traffic. In some examples, the scheduler 1235 may schedule transmission of the SSB within a first candidate location of the set of candidate locations of the radio frame that does not overlap with a resource of the radio frame scheduled for transmission of data traffic.

The SSB transmitter 1240 may transmit, within the time window, the SSB that indicates a relationship between a location of the SSB and a boundary of the radio frame. In some examples, the SSB transmitter 1240 may transmit the SSB at the first candidate location within the radio frame based on the scheduling. In some examples, the SSB transmitter 1240 may transmit a set of SSBs including the SSB in a set of flexible locations within the time window, each of the set of SSBs indicating an offset of a respective SSB with respect to the boundary of the radio frame. In some examples, the SSB transmitter 1240 may transmit the SSB at a first flexible location of a set of flexible locations within the time window, where the SSB indicates the first flexible location. In some examples, the SSB transmitter 1240 may transmit the SSB at a first flexible location of a set of flexible locations within the time window, where the first flexible location indicates an SSB ID associated with the SSB.

The candidate transmitter 1245 may transmit control signaling that indicates a set of candidate locations for an SSB within a radio frame.

The configuration transmitter 1225 may transmit respective semi-persistent transmission configurations via respective component carriers of the set of frequency resources. In some examples, the configuration transmitter 1225 may transmit a configuration ID and an anchoring cell ID associated with the resource switching pattern in the resource switching pattern configuration. In some cases, the respective semi-persistent transmission configuration for each respective component carrier at least includes a time period that occurs between adjacent communication occasions for the semi-persistent transmission on the respective component carrier. In some cases, the respective semi-persistent transmission configuration for each respective component carrier at least includes a time duration, where the semi-persistent transmission configuration for the respective component carrier is valid. In some cases, the anchoring cell ID corresponds to a cell supporting the first frequency resource. In some cases, the configuration ID indicates the switching from the first frequency resource to the different frequency resource.

The selection manager 1250 may select the first candidate location of the set of candidate locations for the SSB based on the resource of the radio frame scheduled for transmission of data traffic, where each of the set of candidate locations is associated with a respective SSB ID. In some examples, the selection manager 1250 may select a subset of the set of candidate locations for transmission of the SSB, where each of the subset of the set of candidate locations is associated with an SSB ID that corresponds to the SSB.

Figure 13:
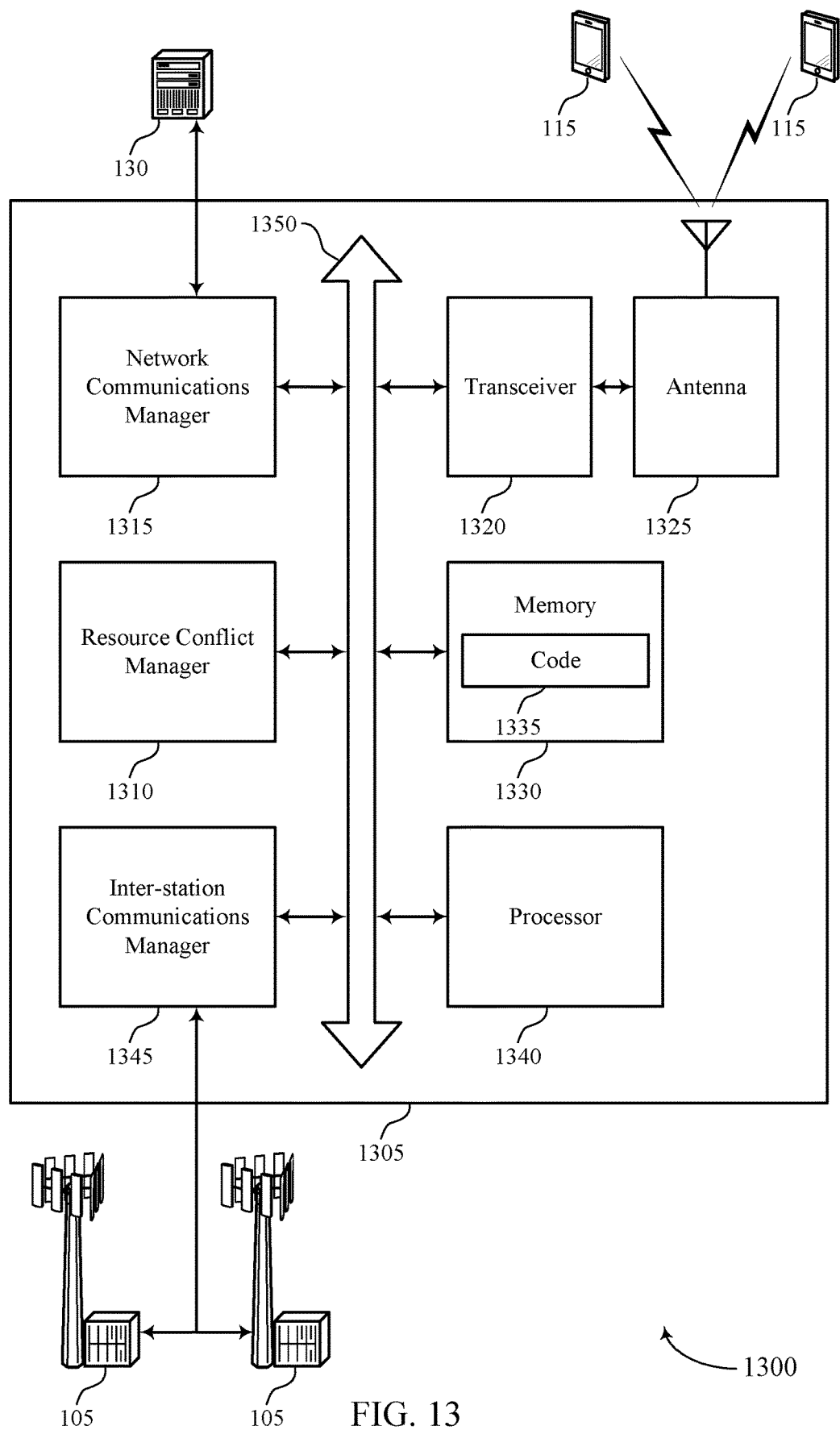
FIG. 13 shows a diagram of a system including a device that supports resource conflict resolution in accordance with aspects of the present disclosure.

FIG. 13 shows a diagram of a system 1300 including a device 1305 that supports resource conflict resolution in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a resource conflict manager 1310, a network communications manager 1315, a transceiver 1320, an antenna 1325, memory 1330, a processor 1340, and an inter-station communications manager 1345. These components may be in electronic communication via one or more buses (e.g., bus 1350).

The resource conflict manager 1310 may transmit control signaling for configuring a UE with a set of frequency resources for communicating with the base station and a resource allocation for a semi-persistent transmission via a first frequency resource of the set of frequency resources, identify a resource switching pattern for switching from the first frequency resource to a different frequency resource of the set of frequency resources, and communicate the semi-persistent transmission with the UE via a second frequency resource of the set of frequency resources based on the resource switching pattern.

The resource conflict manager 1310 may also transmit control signaling that indicates a time window within which a UE is to monitor for an SSB within a radio frame, schedule transmission of data traffic within the radio frame and transmission of the SSB within a portion of the radio frame not scheduled for transmission of data traffic, and transmit, within the time window, the SSB that indicates a relationship between a location of the SSB and a boundary of the radio frame.

The resource conflict manager 1310 may also transmit control signaling that indicates a set of candidate locations for an SSB within a radio frame, schedule transmission of the SSB within a first candidate location of the set of candidate locations of the radio frame that does not overlap with a resource of the radio frame scheduled for transmission of data traffic, and transmit the SSB at the first candidate location within the radio frame based on the scheduling.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the device 1305 may include a single antenna 1325. However, in some cases the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting resource conflict resolution).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
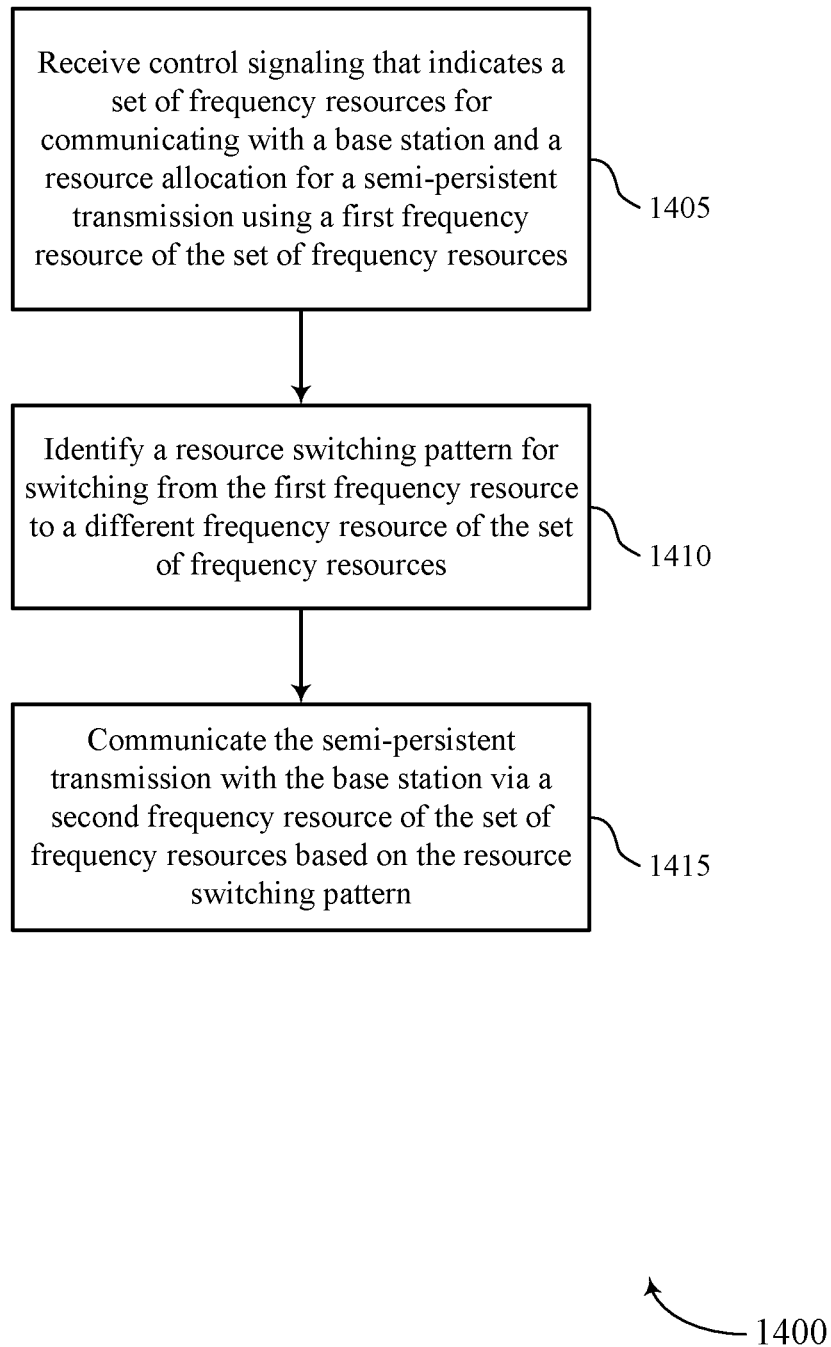
FIGS. 14 through 25 show flowcharts illustrating methods that support resource conflict resolution in accordance with aspects of the present disclosure.

FIG. 14 shows a flowchart illustrating a method 1400 that supports resource conflict resolution in accordance with aspects of the present disclosure. The operations of method 1400 may be implemented by a UE 115 or its components as described herein. For example, the operations of method 1400 may be performed by a resource conflict manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive control signaling that indicates a set of frequency resources for communicating with a base station and a resource allocation for a semi-persistent transmission using a first frequency resource of the set of frequency resources. The operations of 1405 may be performed according to the methods described herein. In some examples, aspects of the operations of 1405 may be performed by a control receiver as described with reference to FIGS. 6 through 9.

At 1410, the UE may identify a resource switching pattern for switching from the first frequency resource to a different frequency resource of the set of frequency resources. The operations of 1410 may be performed according to the methods described herein. In some examples, aspects of the operations of 1410 may be performed by a resource pattern manager as described with reference to FIGS. 6 through 9.

At 1415, the UE may communicate the semi-persistent transmission with the base station via a second frequency resource of the set of frequency resources based on the resource switching pattern. The operations of 1415 may be performed according to the methods described herein. In some examples, aspects of the operations of 1415 may be performed by a communication component as described with reference to FIGS. 6 through 9.

Figure 15:
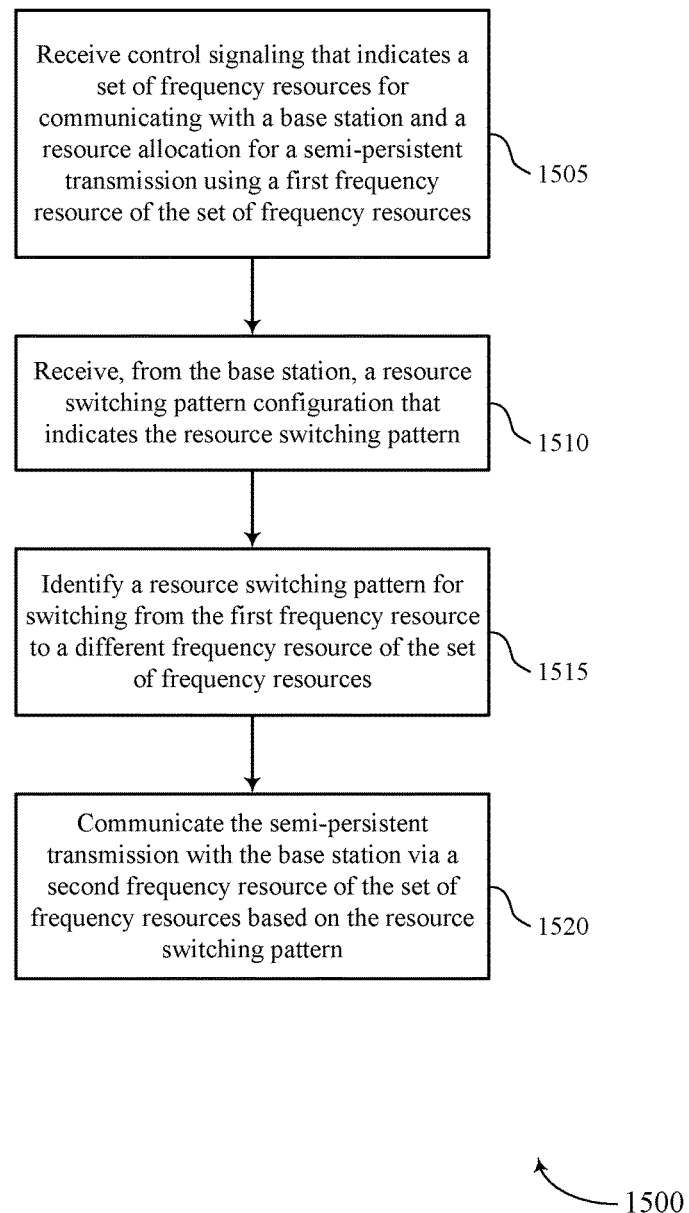

FIG. 15 shows a flowchart illustrating a method 1500 that supports resource conflict resolution in accordance with aspects of the present disclosure. The operations of method 1500 may be implemented by a UE 115 or its components as described herein. For example, the operations of method 1500 may be performed by a resource conflict manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive control signaling that indicates a set of frequency resources for communicating with a base station and a resource allocation for a semi-persistent transmission using a first frequency resource of the set of frequency resources. The operations of 1505 may be performed according to the methods described herein. In some examples, aspects of the operations of 1505 may be performed by a control receiver as described with reference to FIGS. 6 through 9.

At 1510, the UE may receive, from the base station, a resource switching pattern configuration that indicates the resource switching pattern. The operations of 1510 may be performed according to the methods described herein. In some examples, aspects of the operations of 1510 may be performed by a resource pattern manager as described with reference to FIGS. 6 through 9.

At 1515, the UE may identify a resource switching pattern for switching from the first frequency resource to a different frequency resource of the set of frequency resources. The operations of 1515 may be performed according to the methods described herein. In some examples, aspects of the operations of 1515 may be performed by a resource pattern manager as described with reference to FIGS. 6 through 9.

At 1520, the UE may communicate the semi-persistent transmission with the base station via a second frequency resource of the set of frequency resources based on the resource switching pattern. The operations of 1520 may be performed according to the methods described herein. In some examples, aspects of the operations of 1520 may be performed by a communication component as described with reference to FIGS. 6 through 9.

Figure 16:
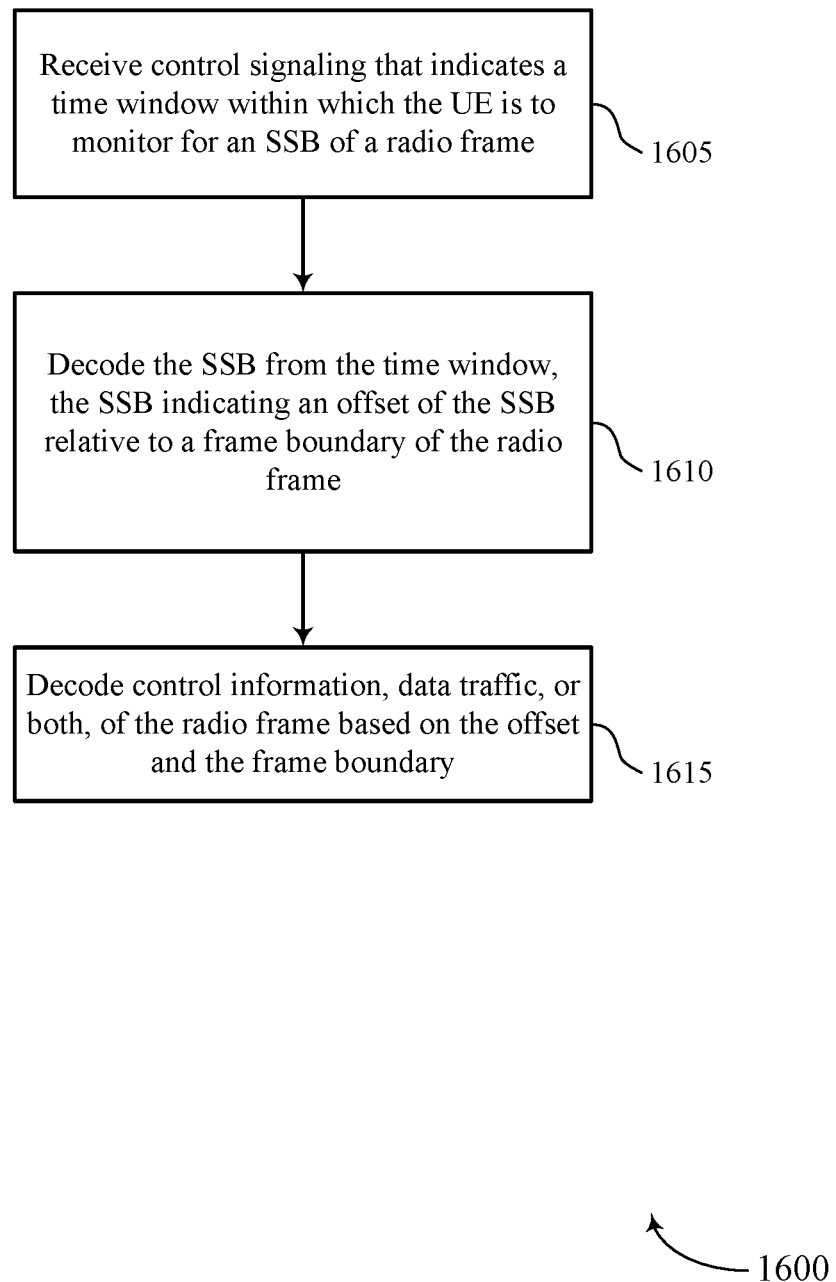

FIG. 16 shows a flowchart illustrating a method 1600 that supports resource conflict resolution in accordance with aspects of the present disclosure. The operations of method 1600 may be implemented by a UE 115 or its components as described herein. For example, the operations of method 1600 may be performed by a resource conflict manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive control signaling that indicates a time window within which the UE is to monitor for an SSB of a radio frame. The operations of 1605 may be performed according to the methods described herein. In some examples, aspects of the operations of 1605 may be performed by a time window manager as described with reference to FIGS. 6 through 9.

At 1610, the UE may decode the SSB from the time window, the SSB indicating an offset of the SSB relative to a frame boundary of the radio frame. The operations of 1610 may be performed according to the methods described herein. In some examples, aspects of the operations of 1610 may be performed by an SSB decoder as described with reference to FIGS. 6 through 9.

At 1615, the UE may decode control information, data traffic, or both, of the radio frame based on the offset and the frame boundary. The operations of 1615 may be performed according to the methods described herein. In some examples, aspects of the operations of 1615 may be performed by a traffic decoder as described with reference to FIGS. 6 through 9.

Figure 17:
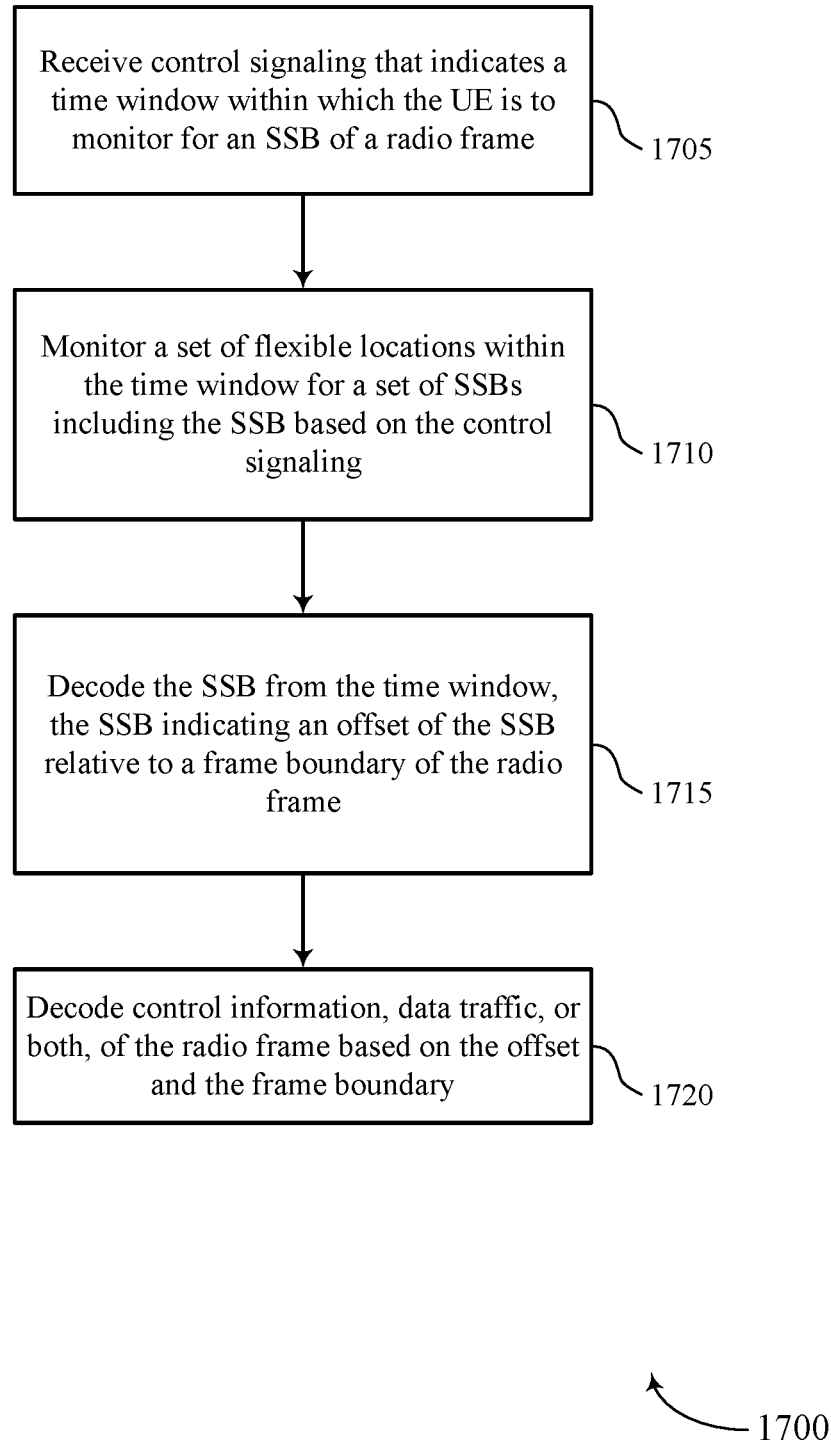

FIG. 17 shows a flowchart illustrating a method 1700 that supports resource conflict resolution in accordance with aspects of the present disclosure. The operations of method 1700 may be implemented by a UE 115 or its components as described herein. For example, the operations of method 1700 may be performed by a resource conflict manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may receive control signaling that indicates a time window within which the UE is to monitor for an SSB of a radio frame. The operations of 1705 may be performed according to the methods described herein. In some examples, aspects of the operations of 1705 may be performed by a time window manager as described with reference to FIGS. 6 through 9.

At 1710, the UE may monitor a set of flexible locations within the time window for a set of SSBs including the SSB based on the control signaling. The operations of 1710 may be performed according to the methods described herein. In some examples, aspects of the operations of 1710 may be performed by a monitoring component as described with reference to FIGS. 6 through 9.

At 1715, the UE may decode the SSB from the time window, the SSB indicating an offset of the SSB relative to a frame boundary of the radio frame. The operations of 1715 may be performed according to the methods described herein. In some examples, aspects of the operations of 1715 may be performed by an SSB decoder as described with reference to FIGS. 6 through 9.

At 1720, the UE may decode control information, data traffic, or both, of the radio frame based on the offset and the frame boundary. The operations of 1720 may be performed according to the methods described herein. In some examples, aspects of the operations of 1720 may be performed by a traffic decoder as described with reference to FIGS. 6 through 9.

Figure 18:
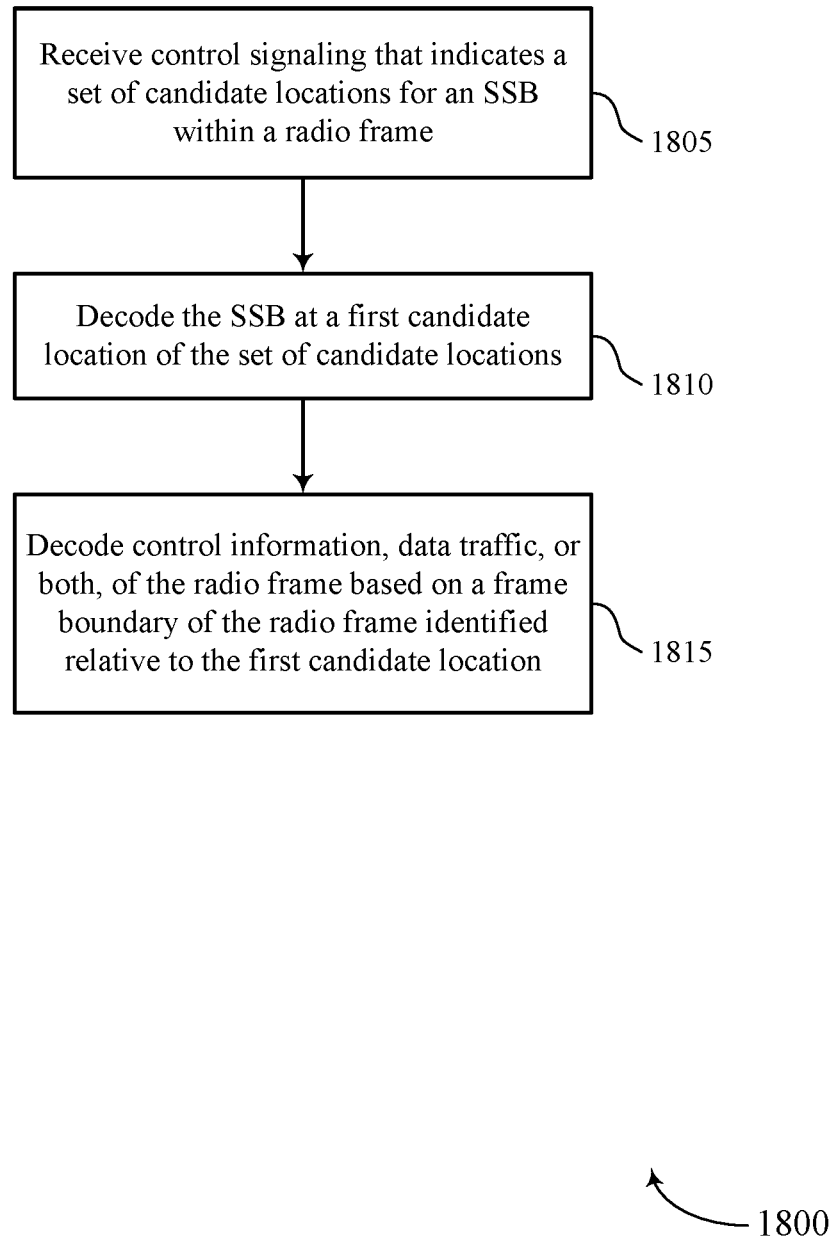

FIG. 18 shows a flowchart illustrating a method 1800 that supports resource conflict resolution in accordance with aspects of the present disclosure. The operations of method 1800 may be implemented by a UE 115 or its components as described herein. For example, the operations of method 1800 may be performed by a resource conflict manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1805, the UE may receive control signaling that indicates a set of candidate locations for an SSB within a radio frame. The operations of 1805 may be performed according to the methods described herein. In some examples, aspects of the operations of 1805 may be performed by a candidate manager as described with reference to FIGS. 6 through 9.

At 1810, the UE may decode the SSB at a first candidate location of the set of candidate locations. The operations of 1810 may be performed according to the methods described herein. In some examples, aspects of the operations of 1810 may be performed by an SSB decoder as described with reference to FIGS. 6 through 9.

At 1815, the UE may decode control information, data traffic, or both, of the radio frame based on a frame boundary of the radio frame identified relative to the first candidate location. The operations of 1815 may be performed according to the methods described herein. In some examples, aspects of the operations of 1815 may be performed by a traffic decoder as described with reference to FIGS. 6 through 9.

Figure 19:
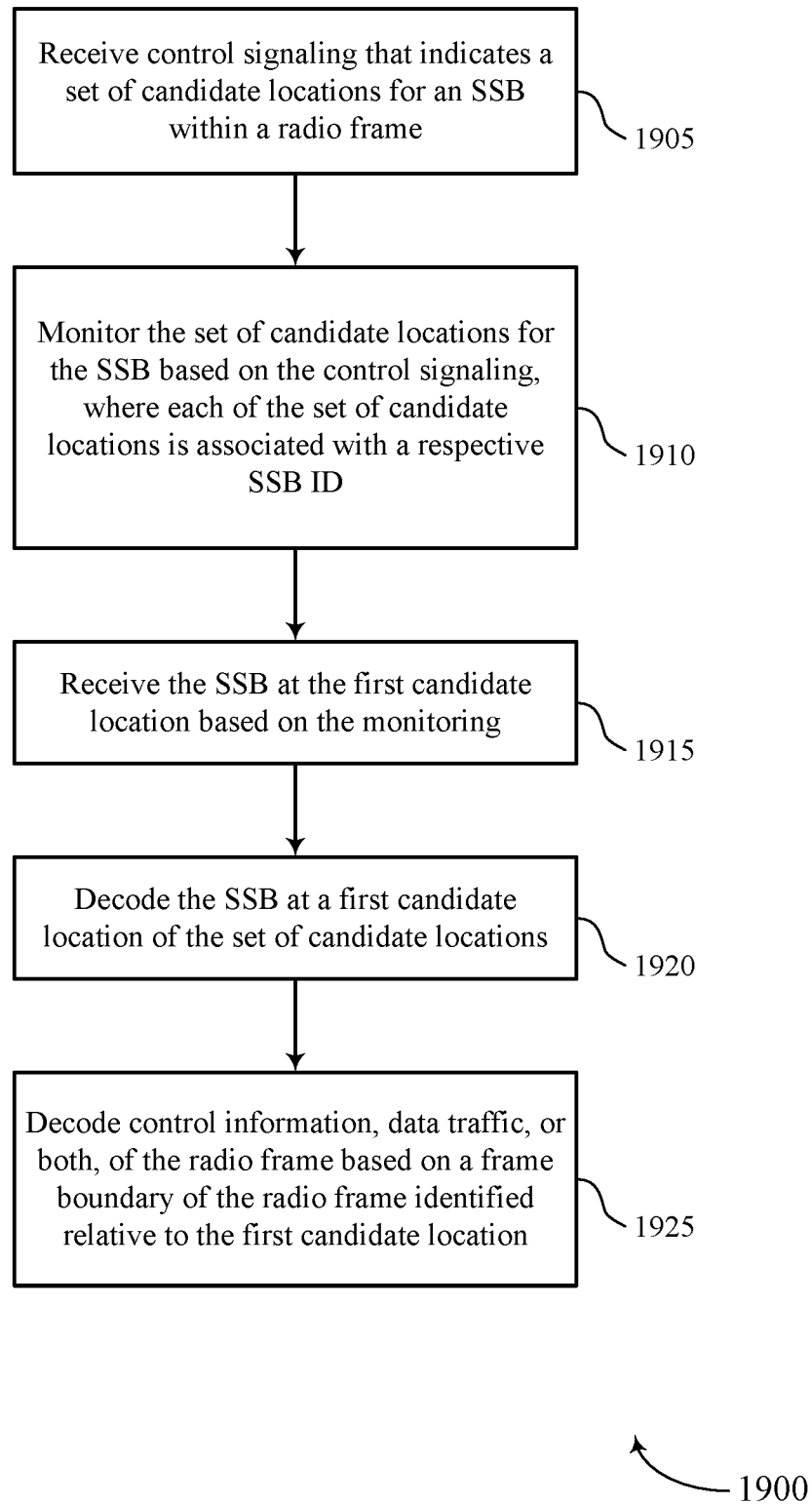

FIG. 19 shows a flowchart illustrating a method 1900 that supports resource conflict resolution in accordance with aspects of the present disclosure. The operations of method 1900 may be implemented by a UE 115 or its components as described herein. For example, the operations of method 1900 may be performed by a resource conflict manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1905, the UE may receive control signaling that indicates a set of candidate locations for an SSB within a radio frame. The operations of 1905 may be performed according to the methods described herein. In some examples, aspects of the operations of 1905 may be performed by a candidate manager as described with reference to FIGS. 6 through 9.

At 1910, the UE may monitor the set of candidate locations for the SSB based on the control signaling, where each of the set of candidate locations is associated with a respective SSB ID. The operations of 1910 may be performed according to the methods described herein. In some examples, aspects of the operations of 1910 may be performed by a monitoring component as described with reference to FIGS. 6 through 9.

At 1915, the UE may receive the SSB at the first candidate location based on the monitoring. The operations of 1915 may be performed according to the methods described herein. In some examples, aspects of the operations of 1915 may be performed by a monitoring component as described with reference to FIGS. 6 through 9.

At 1920, the UE may decode the SSB at a first candidate location of the set of candidate locations. The operations of 1920 may be performed according to the methods described herein. In some examples, aspects of the operations of 1920 may be performed by an SSB decoder as described with reference to FIGS. 6 through 9.

At 1925, the UE may decode control information, data traffic, or both, of the radio frame based on a frame boundary of the radio frame identified relative to the first candidate location. The operations of 1925 may be performed according to the methods described herein. In some examples, aspects of the operations of 1925 may be performed by a traffic decoder as described with reference to FIGS. 6 through 9.

Figure 20:
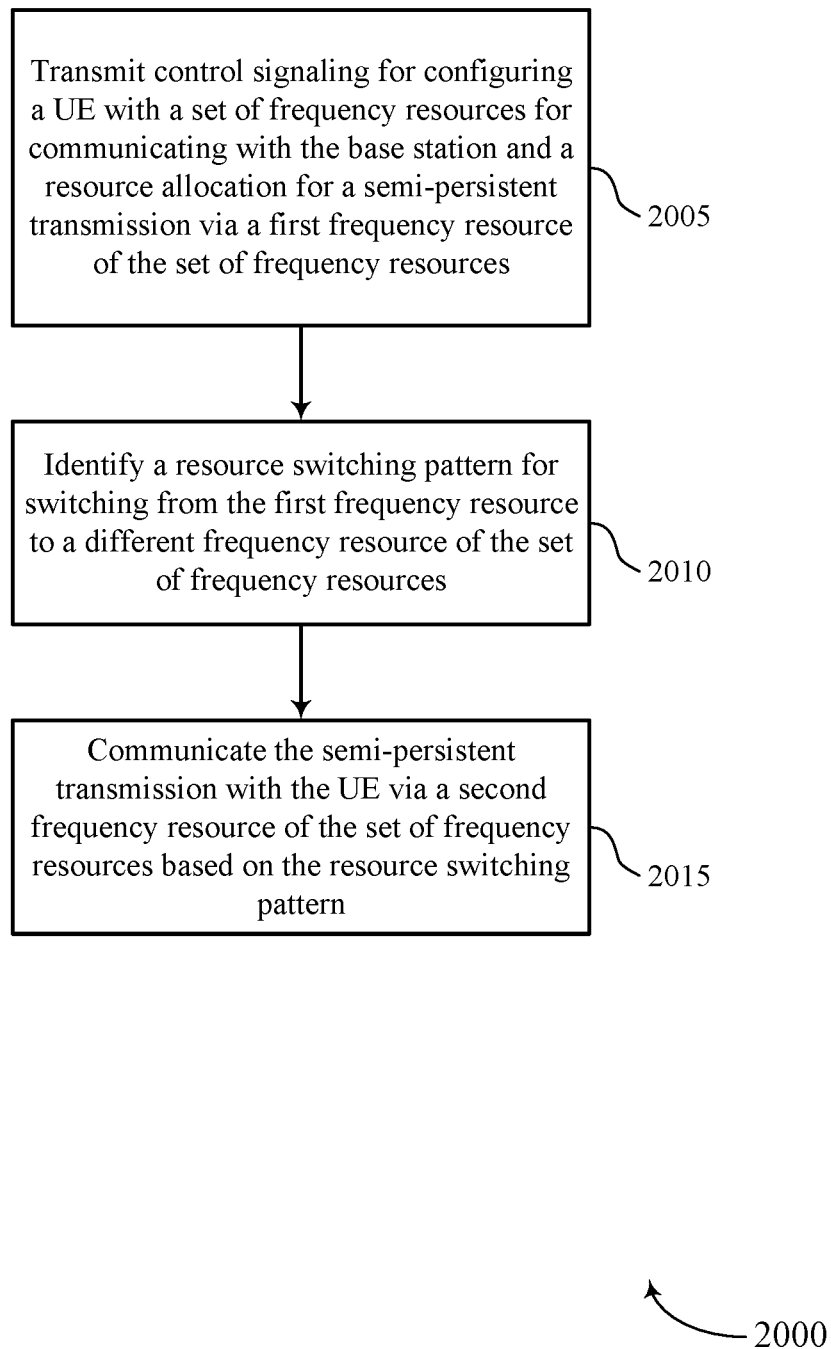

FIG. 20 shows a flowchart illustrating a method 2000 that supports resource conflict resolution in accordance with aspects of the present disclosure. The operations of method 2000 may be implemented by a base station 105 or its components as described herein. For example, the operations of method 2000 may be performed by a resource conflict manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2005, the base station may transmit control signaling for configuring a UE with a set of frequency resources for communicating with the base station and a resource allocation for a semi-persistent transmission via a first frequency resource of the set of frequency resources. The operations of 2005 may be performed according to the methods described herein. In some examples, aspects of the operations of 2005 may be performed by a control transmitter as described with reference to FIGS. 10 through 13.

At 2010, the base station may identify a resource switching pattern for switching from the first frequency resource to a different frequency resource of the set of frequency resources. The operations of 2010 may be performed according to the methods described herein. In some examples, aspects of the operations of 2010 may be performed by a resource switching component as described with reference to FIGS. 10 through 13.

At 2015, the base station may communicate the semi-persistent transmission with the UE via a second frequency resource of the set of frequency resources based on the resource switching pattern. The operations of 2015 may be performed according to the methods described herein. In some examples, aspects of the operations of 2015 may be performed by a communication manager as described with reference to FIGS. 10 through 13.

Figure 21:
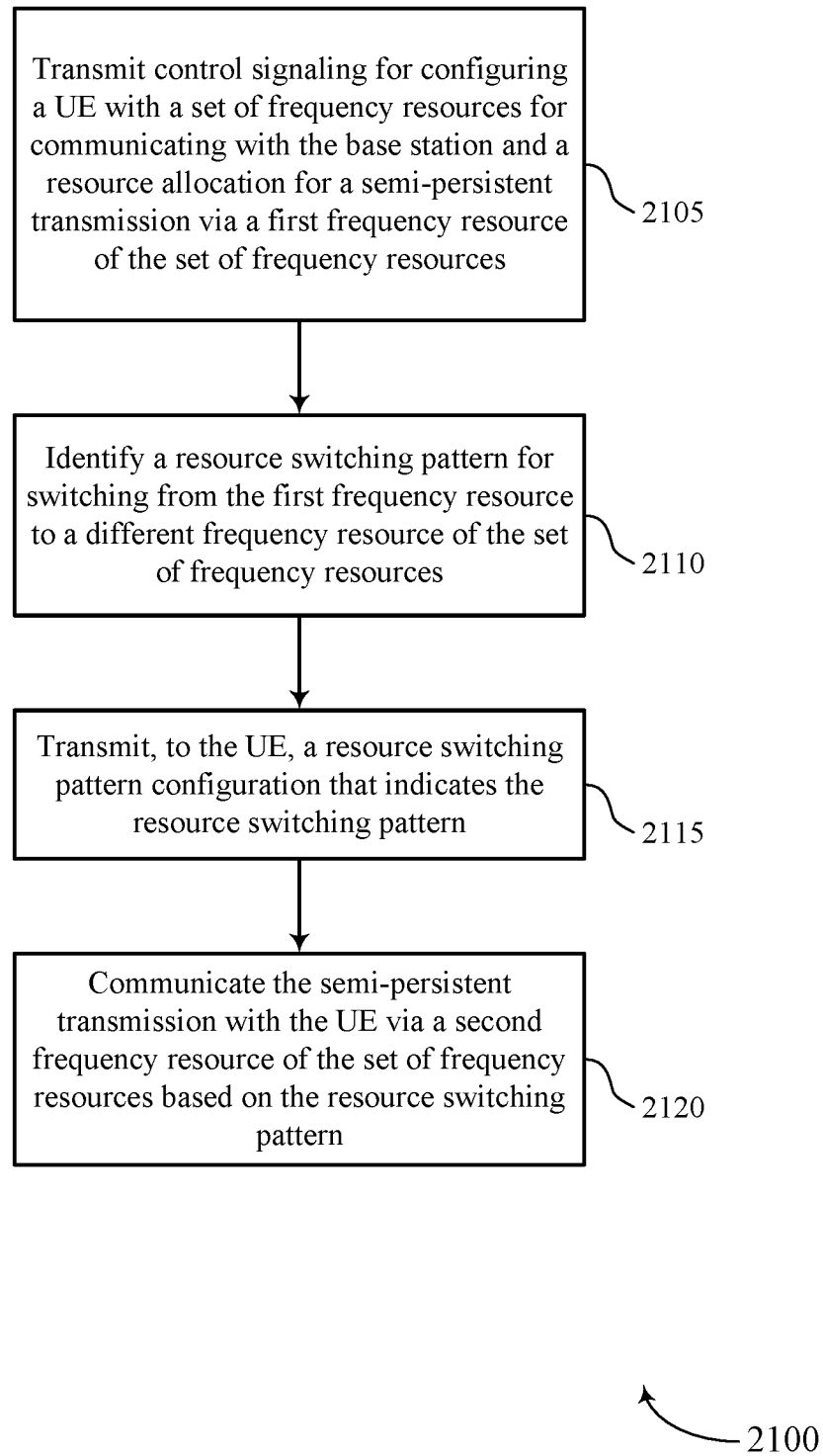

FIG. 21 shows a flowchart illustrating a method 2100 that supports resource conflict resolution in accordance with aspects of the present disclosure. The operations of method 2100 may be implemented by a base station 105 or its components as described herein. For example, the operations of method 2100 may be performed by a resource conflict manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2105, the base station may transmit control signaling for configuring a UE with a set of frequency resources for communicating with the base station and a resource allocation for a semi-persistent transmission via a first frequency resource of the set of frequency resources. The operations of 2105 may be performed according to the methods described herein. In some examples, aspects of the operations of 2105 may be performed by a control transmitter as described with reference to FIGS. 10 through 13.

At 2110, the base station may identify a resource switching pattern for switching from the first frequency resource to a different frequency resource of the set of frequency resources. The operations of 2110 may be performed according to the methods described herein. In some examples, aspects of the operations of 2110 may be performed by a resource switching component as described with reference to FIGS. 10 through 13.

At 2115, the base station may transmit, to the UE, a resource switching pattern configuration that indicates the resource switching pattern. The operations of 2115 may be performed according to the methods described herein. In some examples, aspects of the operations of 2115 may be performed by a resource switching component as described with reference to FIGS. 10 through 13.

At 2120, the base station may communicate the semi-persistent transmission with the UE via a second frequency resource of the set of frequency resources based on the resource switching pattern. The operations of 2120 may be performed according to the methods described herein. In some examples, aspects of the operations of 2120 may be performed by a communication manager as described with reference to FIGS. 10 through 13.

Figure 22:
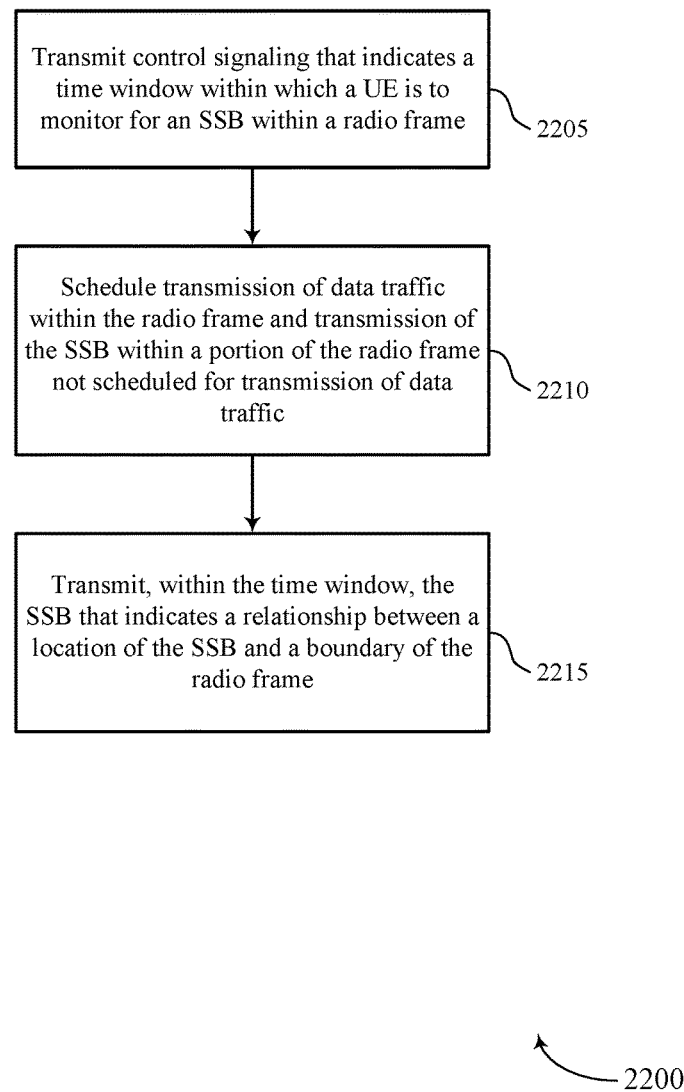

FIG. 22 shows a flowchart illustrating a method 2200 that supports resource conflict resolution in accordance with aspects of the present disclosure. The operations of method 2200 may be implemented by a base station 105 or its components as described herein. For example, the operations of method 2200 may be performed by a resource conflict manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2205, the base station may transmit control signaling that indicates a time window within which a UE is to monitor for an SSB within a radio frame. The operations of 2205 may be performed according to the methods described herein. In some examples, aspects of the operations of 2205 may be performed by a window transmitter as described with reference to FIGS. 10 through 13.

At 2210, the base station may schedule transmission of data traffic within the radio frame and transmission of the SSB within a portion of the radio frame not scheduled for transmission of data traffic. The operations of 2210 may be performed according to the methods described herein. In some examples, aspects of the operations of 2210 may be performed by a scheduler as described with reference to FIGS. 10 through 13.

At 2215, the base station may transmit, within the time window, the SSB that indicates a relationship between a location of the SSB and a boundary of the radio frame. The operations of 2215 may be performed according to the methods described herein. In some examples, aspects of the operations of 2215 may be performed by an SSB transmitter as described with reference to FIGS. 10 through 13.

Figure 23:
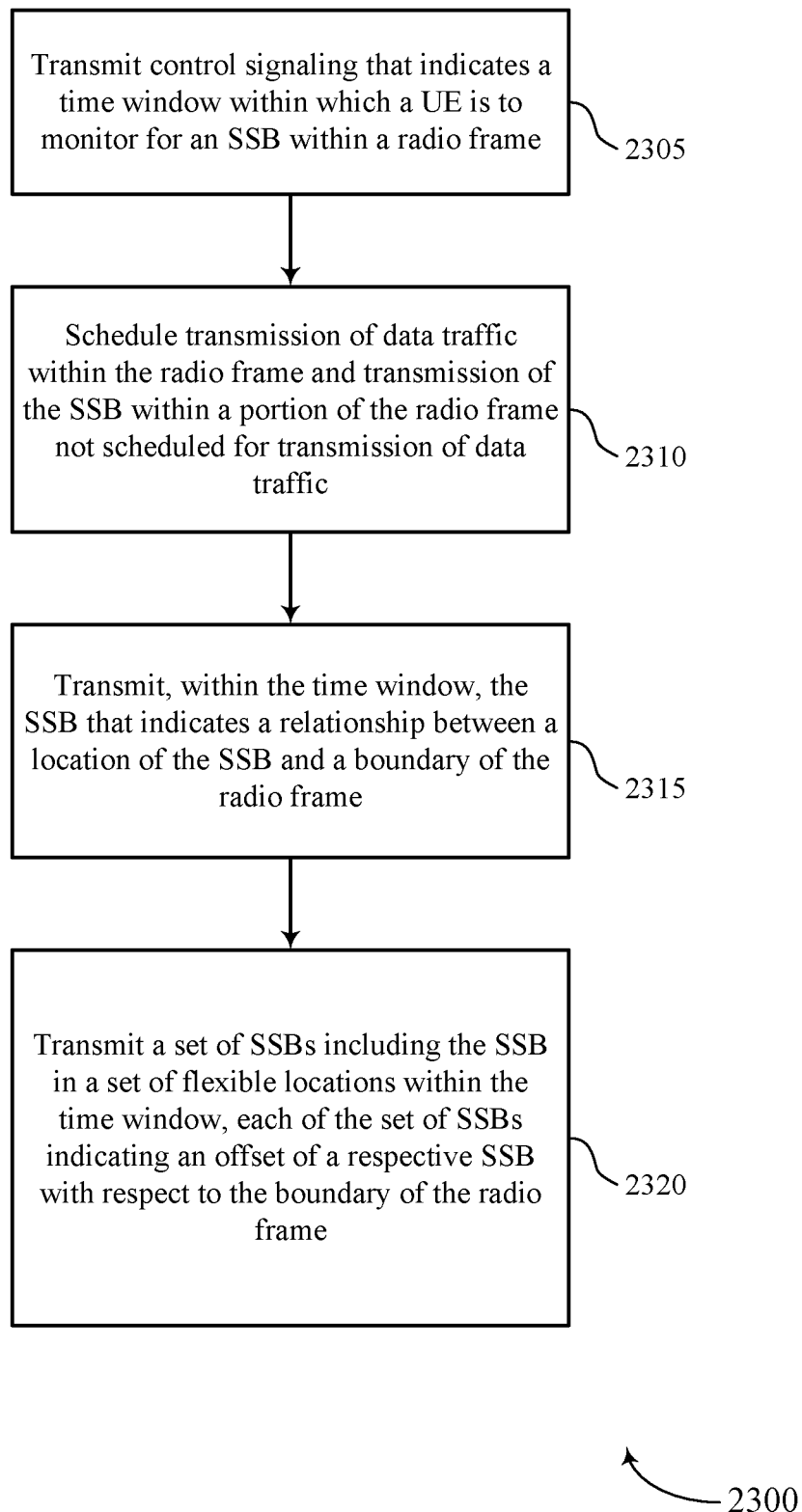

FIG. 23 shows a flowchart illustrating a method 2300 that supports resource conflict resolution in accordance with aspects of the present disclosure. The operations of method 2300 may be implemented by a base station 105 or its components as described herein. For example, the operations of method 2300 may be performed by a resource conflict manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2305, the base station may transmit control signaling that indicates a time window within which a UE is to monitor for an SSB within a radio frame. The operations of 2305 may be performed according to the methods described herein. In some examples, aspects of the operations of 2305 may be performed by a window transmitter as described with reference to FIGS. 10 through 13.

At 2310, the base station may schedule transmission of data traffic within the radio frame and transmission of the SSB within a portion of the radio frame not scheduled for transmission of data traffic. The operations of 2310 may be performed according to the methods described herein. In some examples, aspects of the operations of 2310 may be performed by a scheduler as described with reference to FIGS. 10 through 13.

At 2315, the base station may transmit, within the time window, the SSB that indicates a relationship between a location of the SSB and a boundary of the radio frame. The operations of 2315 may be performed according to the methods described herein. In some examples, aspects of the operations of 2315 may be performed by an SSB transmitter as described with reference to FIGS. 10 through 13.

At 2320, the base station may transmit a set of SSBs including the SSB in a set of flexible locations within the time window, each of the set of SSBs indicating an offset of a respective SSB with respect to the boundary of the radio frame. The operations of 2320 may be performed according to the methods described herein. In some examples, aspects of the operations of 2320 may be performed by an SSB transmitter as described with reference to FIGS. 10 through 13.

Figure 24:
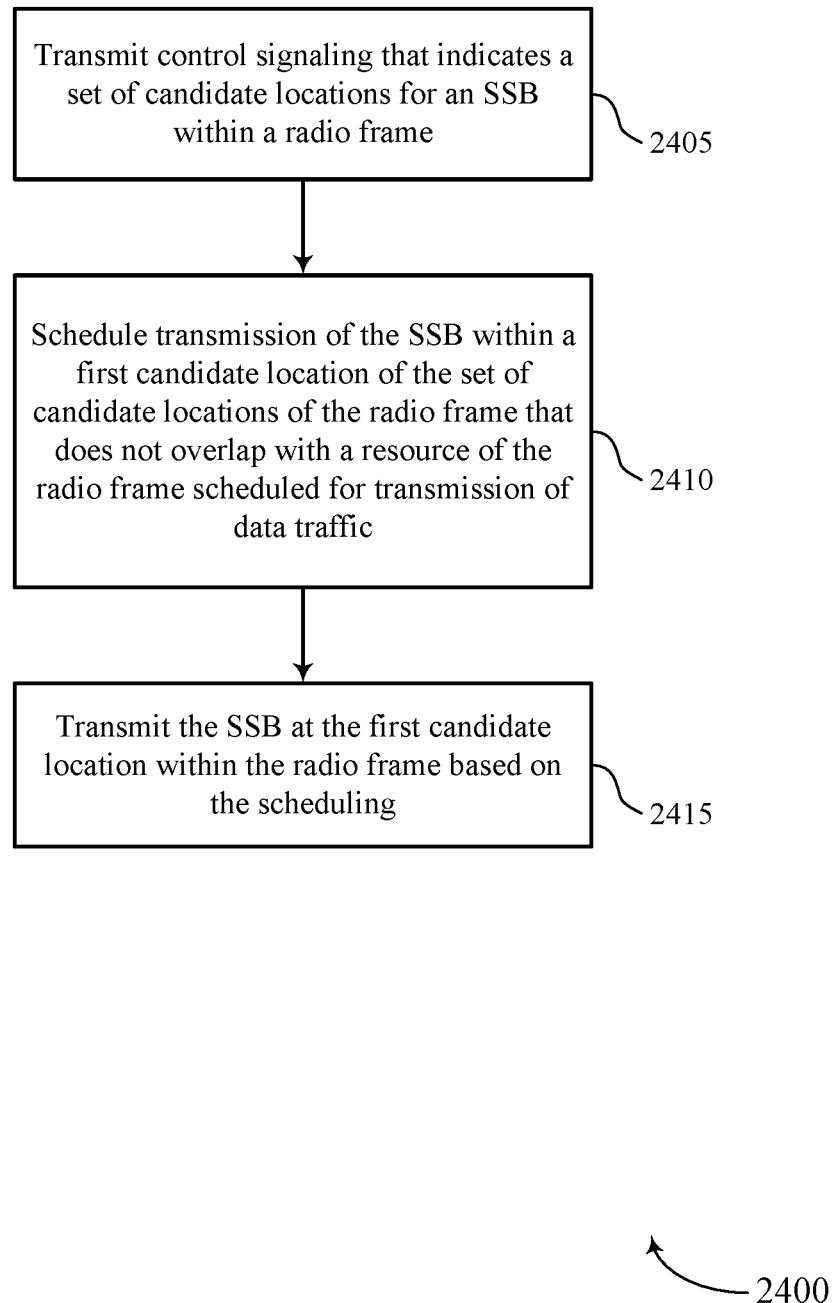

FIG. 24 shows a flowchart illustrating a method 2400 that supports resource conflict resolution in accordance with aspects of the present disclosure. The operations of method 2400 may be implemented by a base station 105 or its components as described herein. For example, the operations of method 2400 may be performed by a resource conflict manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2405, the base station may transmit control signaling that indicates a set of candidate locations for an SSB within a radio frame. The operations of 2405 may be performed according to the methods described herein. In some examples, aspects of the operations of 2405 may be performed by a candidate transmitter as described with reference to FIGS. 10 through 13.

At 2410, the base station may schedule transmission of the SSB within a first candidate location of the set of candidate locations of the radio frame that does not overlap with a resource of the radio frame scheduled for transmission of data traffic. The operations of 2410 may be performed according to the methods described herein. In some examples, aspects of the operations of 2410 may be performed by a scheduler as described with reference to FIGS. 10 through 13.

At 2415, the base station may transmit the SSB at the first candidate location within the radio frame based on the scheduling. The operations of 2415 may be performed according to the methods described herein. In some examples, aspects of the operations of 2415 may be performed by an SSB transmitter as described with reference to FIGS. 10 through 13.

Figure 25:
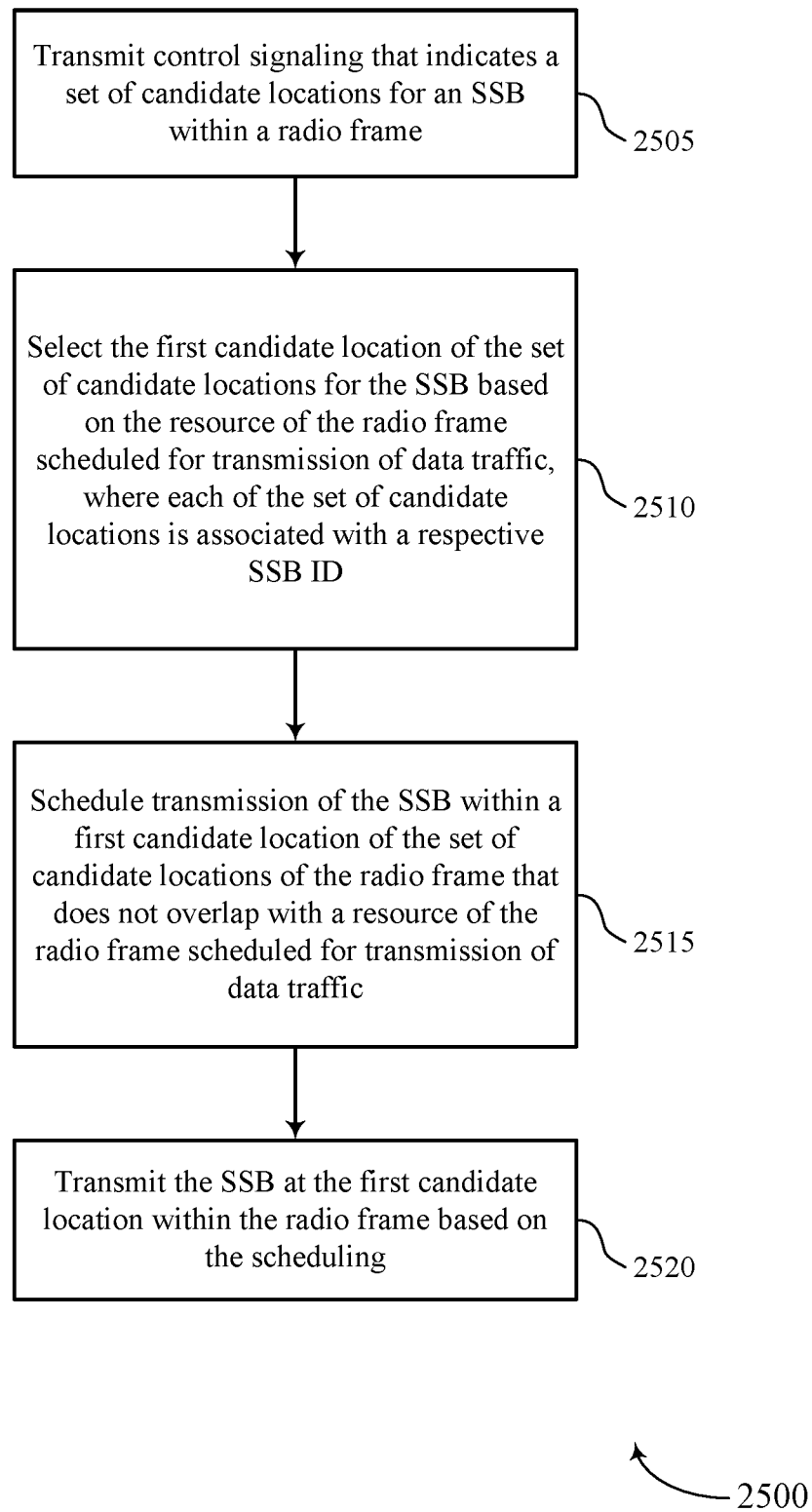

FIG. 25 shows a flowchart illustrating a method 2500 that supports resource conflict resolution in accordance with aspects of the present disclosure. The operations of method 2500 may be implemented by a base station 105 or its components as described herein. For example, the operations of method 2500 may be performed by a resource conflict manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2505, the base station may transmit control signaling that indicates a set of candidate locations for an SSB within a radio frame. The operations of 2505 may be performed according to the methods described herein. In some examples, aspects of the operations of 2505 may be performed by a candidate transmitter as described with reference to FIGS. 10 through 13.

At 2510, the base station may select the first candidate location of the set of candidate locations for the SSB based on the resource of the radio frame scheduled for transmission of data traffic, where each of the set of candidate locations is associated with a respective SSB ID. The operations of 2510 may be performed according to the methods described herein. In some examples, aspects of the operations of 2510 may be performed by a selection manager as described with reference to FIGS. 10 through 13.

At 2515, the base station may schedule transmission of the SSB within a first candidate location of the set of candidate locations of the radio frame that does not overlap with a resource of the radio frame scheduled for transmission of data traffic. The operations of 2515 may be performed according to the methods described herein. In some examples, aspects of the operations of 2515 may be performed by a scheduler as described with reference to FIGS. 10 through 13.

At 2520, the base station may transmit the SSB at the first candidate location within the radio frame based on the scheduling. The operations of 2520 may be performed according to the methods described herein. In some examples, aspects of the operations of 2520 may be performed by an SSB transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving control signaling that indicates a plurality of frequency resources for communicating with a network device and that indicates a resource allocation for a semi-persistent transmission using a first frequency resource of the plurality of frequency resources;
   receiving signaling that indicates a resource switching pattern for switching from the first frequency resource to a second frequency resource of the plurality of frequency resources, wherein the resource switching pattern is for a plurality of semi-persistent transmissions using a plurality of component carriers and indicates a plurality of time intervals during which the plurality of semi-persistent transmissions are to be switched between the first frequency resource and the second frequency resource; and
   communicating the semi-persistent transmission via the second frequency resource of the plurality of frequency resources, the first frequency resource of the plurality of frequency resources, or both in accordance with the resource switching pattern.

2. The method of claim 1, wherein the plurality of frequency resources comprises one or more component carriers.

3. The method of claim 1, wherein the resource switching pattern is determined at least to avoid the semi-persistent transmission partially overlapping in time with control traffic.

4. The method of claim 3, further comprising:
receiving a synchronization signal block from the network device or transmitting a random access message to the network device, wherein the control traffic comprises the synchronization signal block or the random access message.

5. The method of claim 1, wherein the semi-persistent transmission conveys data.

6. The method of claim 1, wherein the semi-persistent transmission comprises a periodic transmission.

7. The method of claim 1, wherein the semi-persistent transmission comprises a downlink transmission based at least in part on semi-persistent scheduling.

8. The method of claim 1, wherein the semi-persistent transmission comprises an uplink transmission based at least in part on a configured grant.

9. The method of claim 1, further comprising:
receiving, from the network device, a resource switching pattern configuration that indicates the resource switching pattern.

10. The method of claim 9, wherein receiving the resource switching pattern configuration comprises:
receiving, in the resource switching pattern configuration, an indication of a time period that occurs between adjacent communication occasions for communicating the semi-persistent transmission.

11. The method of claim 9, further comprising:
communicating the semi-persistent transmission with the network device via a third frequency resource of the plurality of frequency resources based at least in part on the resource switching pattern for the semi-persistent transmission.

12. The method of claim 9, further comprising:
receiving a semi-persistent transmission configuration for each respective component carrier of the plurality of frequency resources.

13. The method of claim 12, wherein the semi-persistent transmission configuration for each respective component carrier at least includes a time period that occurs between adjacent communication occasions for the semi-persistent transmission on the respective component carrier.

14. The method of claim 12, wherein the semi-persistent transmission configuration for each respective component carrier at least includes a time duration, wherein the semi-persistent transmission configuration for the respective component carrier is valid.

15. The method of claim 9, wherein receiving the resource switching pattern configuration comprises:
receiving a configuration identifier (ID) associated with the resource switching pattern and an anchoring cell ID associated with the resource switching pattern in the resource switching pattern configuration.

16. The method of claim 15, wherein:
the anchoring cell ID corresponds to a cell supporting the first frequency resource; and
the configuration ID indicates the switching from the first frequency resource to the second frequency resource.

17. The method of claim 9, wherein the resource switching pattern is associated with a respective resource switching period of the resource switching pattern configuration.

18. A method for wireless communications at a user equipment (UE), comprising:
receiving control signaling that indicates a time window of a radio frame within which the UE is to monitor for a synchronization signal block;
decoding the synchronization signal block during the time window, the synchronization signal block indicating a first location of the synchronization signal block in the time window as a timing offset of the synchronization signal block relative to a start of a frame boundary of the radio frame; and
decoding one or more messages during the time window and at a second location in the time window different from the first location of the synchronization signal block based at least in part on the timing offset relative to the start of the frame boundary.

19. The method of claim 18, further comprising:
monitoring a set of flexible locations within the time window for a set of synchronization signal blocks including the synchronization signal block based at least in part on the control signaling.

20. The method of claim 19, further comprising:
receiving the synchronization signal block at a first flexible location of the set of flexible locations based at least in part on the monitoring, wherein the synchronization signal block indicates the first flexible location.

21. The method of claim 19, further comprising:
receiving the synchronization signal block at a first flexible location of the set of flexible locations based at least in part on the monitoring, wherein the first flexible location indicates a synchronization signal block identifier associated with the synchronization signal block.

22. A method for wireless communications at a user equipment (UE), comprising:
receiving control signaling that indicates a plurality of candidate locations within a radio frame for a synchronization signal block, wherein a subset of the plurality of candidate locations is associated with a synchronization signal block identifier that corresponds to the synchronization signal block;
decoding the synchronization signal block at a first candidate location of the plurality of candidate locations based at least in part on the synchronization signal block identifier; and
decoding control information, data traffic, or both, of the radio frame based at least in part on a frame boundary of the radio frame identified relative to the first candidate location.

23. The method of claim 22, further comprising:
monitoring the plurality of candidate locations for the synchronization signal block based at least in part on the control signaling, wherein each candidate location of the plurality of candidate locations is associated with a respective synchronization signal block identifier; and
receiving the synchronization signal block at the first candidate location based at least in part on the monitoring.

24. The method of claim 22, wherein:
monitoring the subset of the plurality of candidate locations for the synchronization signal block; and
receiving the synchronization signal block at the first candidate location based at least in part on the monitoring.

25. An apparatus for wireless communications at a user equipment (UE), comprising:

a processor, memory coupled with the processor; and instructions stored in the memory and executable by the processor to cause the apparatus to:

receive control signaling that indicates a plurality of frequency resources for communicating with a network device and that indicates a resource allocation for a semi-persistent transmission using a first frequency resource of the plurality of frequency resources;

receive signaling that indicates a resource switching pattern for switching from the first frequency resource to a second frequency resource of the plurality of frequency resources, wherein the resource switching pattern is for a plurality of semi-persistent transmissions using a plurality of component carriers and indicates a plurality of time intervals during which the plurality of semi-persistent transmissions are to be switched between the first frequency resource and the second frequency resource; and communicate the semi-persistent transmission via the second frequency resource of the plurality of frequency resources, the first frequency resource of the plurality of frequency resources, or both in accordance with the resource switching pattern.

26. The apparatus of claim 25, wherein the plurality of frequency resources comprises one or more component carriers.

27. The apparatus of claim 25, wherein the resource switching pattern is determined at least to avoid the semi-persistent transmission partially overlapping in time with control traffic.

28. The apparatus of claim 27, wherein the instructions are further executable by the processor to cause the apparatus to:

receive a synchronization signal block from the network device or transmit a random access message to the network device, wherein the control traffic comprises the synchronization signal block or the random access message.

29. The apparatus of claim 25, wherein the semi-persistent transmission conveys data.

30. The apparatus of claim 25, wherein the semi-persistent transmission comprises a periodic transmission.

* * * * *